United States Patent [19]
Miyawaki

[11] Patent Number: 5,828,921
[45] Date of Patent: Oct. 27, 1998

[54] CAMERA OR APPARATUS ADAPTED TO USE FILM CARTRIDGE OR DEVICE APPLICABLE TO SUCH CAMERA OR APPARATUS

[75] Inventor: Makoto Miyawaki, Kanagawa-ken, Japan

[73] Assignee: Canon Kabushiki Kaisha, Tokyo, Japan

[21] Appl. No.: 363,398

[22] Filed: Dec. 23, 1994

[30] Foreign Application Priority Data

Dec. 28, 1993 [JP] Japan .................................. 5-349312
Apr. 20, 1994 [JP] Japan .................................. 6-104389
Apr. 20, 1994 [JP] Japan .................................. 6-104390

[51] Int. Cl.$^6$ ............................ G03B 17/02; G03B 17/26
[52] U.S. Cl. ............................ 396/538; 396/513; 396/516
[58] Field of Search ............................ 354/21, 173.1, 354/275, 288; 242/338.4, 338, 339; 352/74, 72, 78; 396/406, 410, 418, 512, 513, 514, 515, 516, 538; 358/906, 909.1; H04N 5/225

[56] References Cited

U.S. PATENT DOCUMENTS

| | | | |
|---|---|---|---|
| 2,357,076 | 8/1944 | Briskin et al. | 352/74 |
| 3,463,580 | 8/1969 | Freudenschusz | 352/74 |
| 3,532,292 | 10/1970 | Crandall et al. | 352/72 |
| 3,593,643 | 7/1971 | Downey | 352/74 |
| 3,608,455 | 9/1971 | Downey | 352/130 |
| 3,817,607 | 6/1974 | Anderson | 352/74 |
| 3,871,754 | 3/1975 | Procop et al. | 352/72 |
| 3,956,759 | 5/1976 | Karikawa | 396/354 |
| 4,145,126 | 3/1979 | Bagby et al. | 352/74 |
| 4,157,867 | 6/1979 | Yokota | 396/354 |
| 4,363,547 | 12/1982 | Hashimoto et al. | 354/173.1 |
| 4,982,211 | 1/1991 | Suzuki | 354/173.2 |
| 5,159,365 | 10/1992 | Takahashi et al. | 354/173.1 |
| 5,247,322 | 9/1993 | Edwards et al. | 396/355 |
| 5,469,271 | 11/1995 | Hoshino et al. | 358/909.1 |

Primary Examiner—A. A. Mathews
Attorney, Agent, or Firm—Robin, Blecker & Daley

[57] ABSTRACT

A camera or an apparatus adapted to use a film cartridge or a device which is applicable to such camera or apparatus includes a cover for a loading chamber into which to load the film cartridge, and a driving part for driving the cover, the driving part having a member for supplying a driving power to the cover by rotating about an axis substantially parallel with an image forming optical axis, and/or a driving part for at least one of loading and removal of the film cartridge, the driving part including a member for supplying a driving power by rotating about an axis substantially parallel with the image forming optical axis.

14 Claims, 25 Drawing Sheets

F I G.13
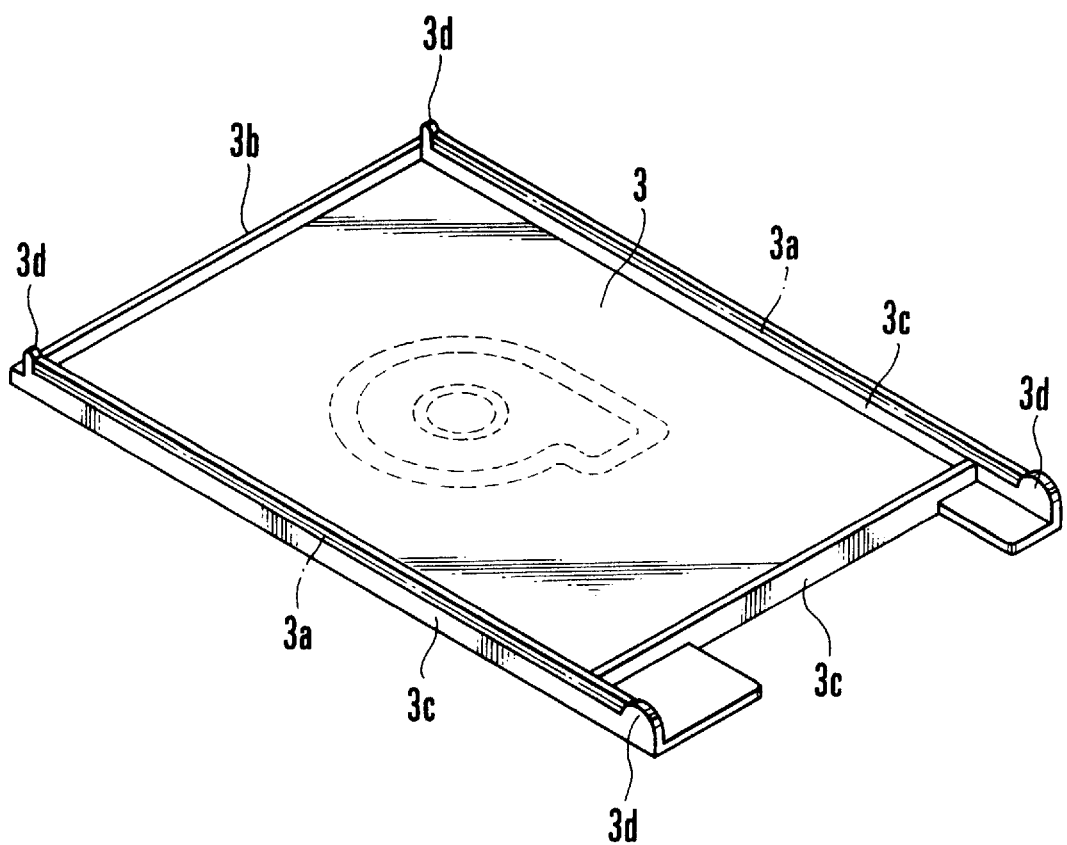

CAMERA OR APPARATUS ADAPTED TO USE FILM CARTRIDGE OR DEVICE APPLICABLE TO SUCH CAMERA OR APPARATUS

BACKGROUND OF THE INVENTION

1. Field of the Invention

The present invention relates to an apparatus such as a camera adapted to use a film cartridge and, more particularly, to an arrangement for loading or removing the film cartridge.

2. Description of the Related Art

Conventionally, a film cartridge is loaded into a camera by manual operation. For example, one loading method includes the steps of opening a lid which is rotatable about a hinge shaft, pressing a film cartridge into an opening and closing the lid. It is desired that this loading method be practised in an electrically powered form so that even a beginner-class user can readily perform a film loading operation or an experienced user can rapidly perform a film loading operation. To meet this demand, it is necessary to develop an electrically powered arrangement which is capable of electrically executing the operation of opening and closing of the lid for a cartridge chamber and the operation of moving the film cartridge.

To achieve such an electrically powered arrangement, it is necessary to use, for example, a motor which is a driving source, a speed reducing mechanism, a transmission mechanism, a transporting mechanism for directly driving a cartridge, and a mechanism for driving a lid which is arranged to open and close, as well as a switch for detecting the state or position of the lid or the film cartridge.

However, there is a risk that an electrically powered cartridge chamber will be larger in size than a conventional, manual cartridge chamber since an electrically powered cartridge transporting mechanism, an insertion detecting switch or a driving mechanism for an electrically powered lid are added to the conventional, manual cartridge chamber.

SUMMARY OF THE INVENTION

It is, therefore, one object of the present invention to automate loading or removal of a film cartridge without increasing the size of the entire apparatus.

To achieve the above object, in accordance with one aspect of the present invention, there is provided a camera or an apparatus which is adapted to use a film cartridge or a device which is applicable to such camera or apparatus. The camera or the apparatus, or the device includes a cover for a loading chamber into which to load the film cartridge, and driving means for driving the cover, the driving means having a member for supplying a driving power to the cover by rotating about an axis substantially parallel with an image forming optical axis, and/or a driving part for at least one of loading and removal of the film cartridge, the driving part including a member for supplying a driving power by rotating about an axis substantially parallel with the image forming optical axis.

The above and other objects and aspects of the present invention will become apparent from the following detailed description of preferred embodiments of the present invention, taken in conjunction with the accompanying drawings.

BRIEF DESCRIPTION OF THE DRAWINGS

FIG. 13 is a perspective view of the slide lid of the camera of FIG. 1;

DETAILED DESCRIPTION OF THE PREFERRED EMBODIMENTS

Preferred embodiments of the present invention will be described below in detail with reference to the accompanying drawings.

Figure 1:
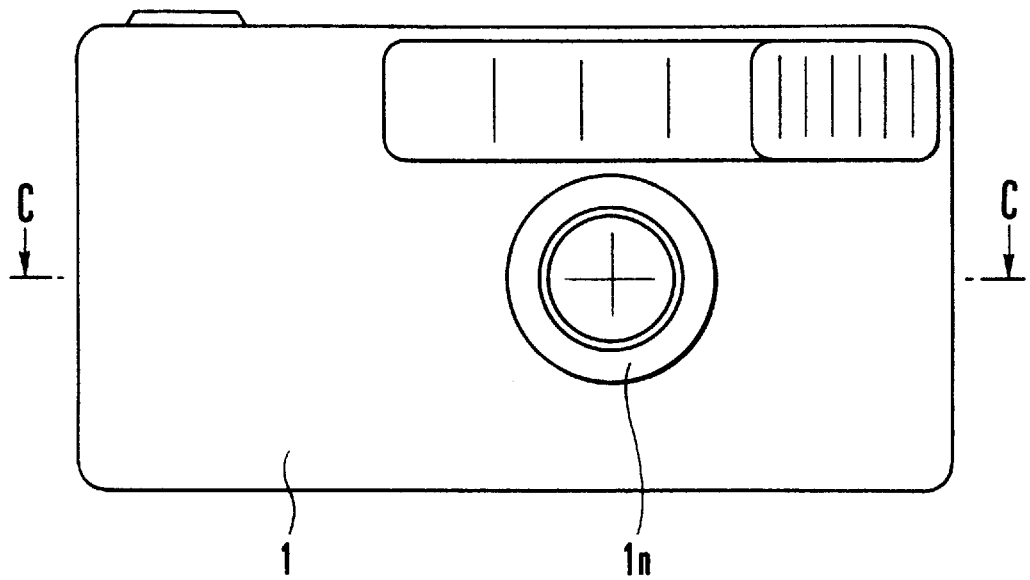
FIG. 1 is a diagrammatic, front elevational view showing the external appearance of a camera according to a first embodiment of the present invention.
Figure 2:
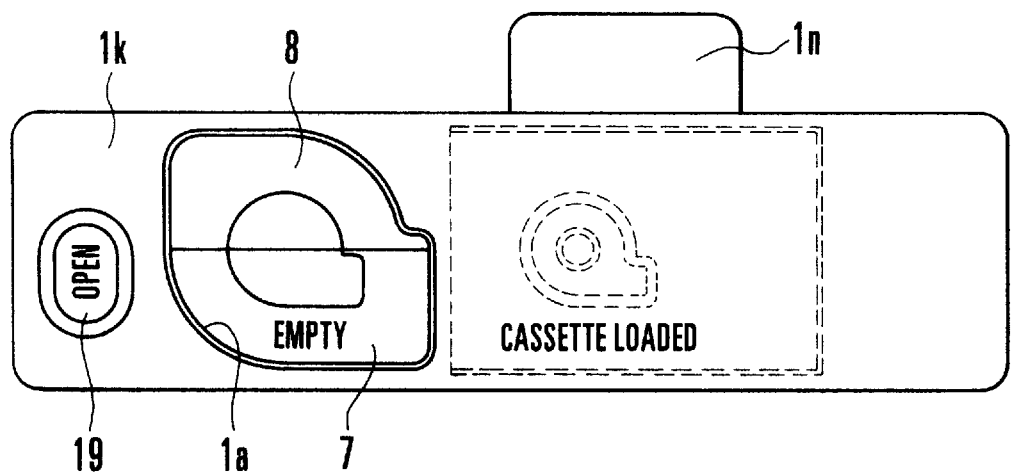
FIG. 2 is a bottom plan view showing the bottom of the camera of FIG. 1 in which a cartridge inserting opening is formed.
Figure 3:
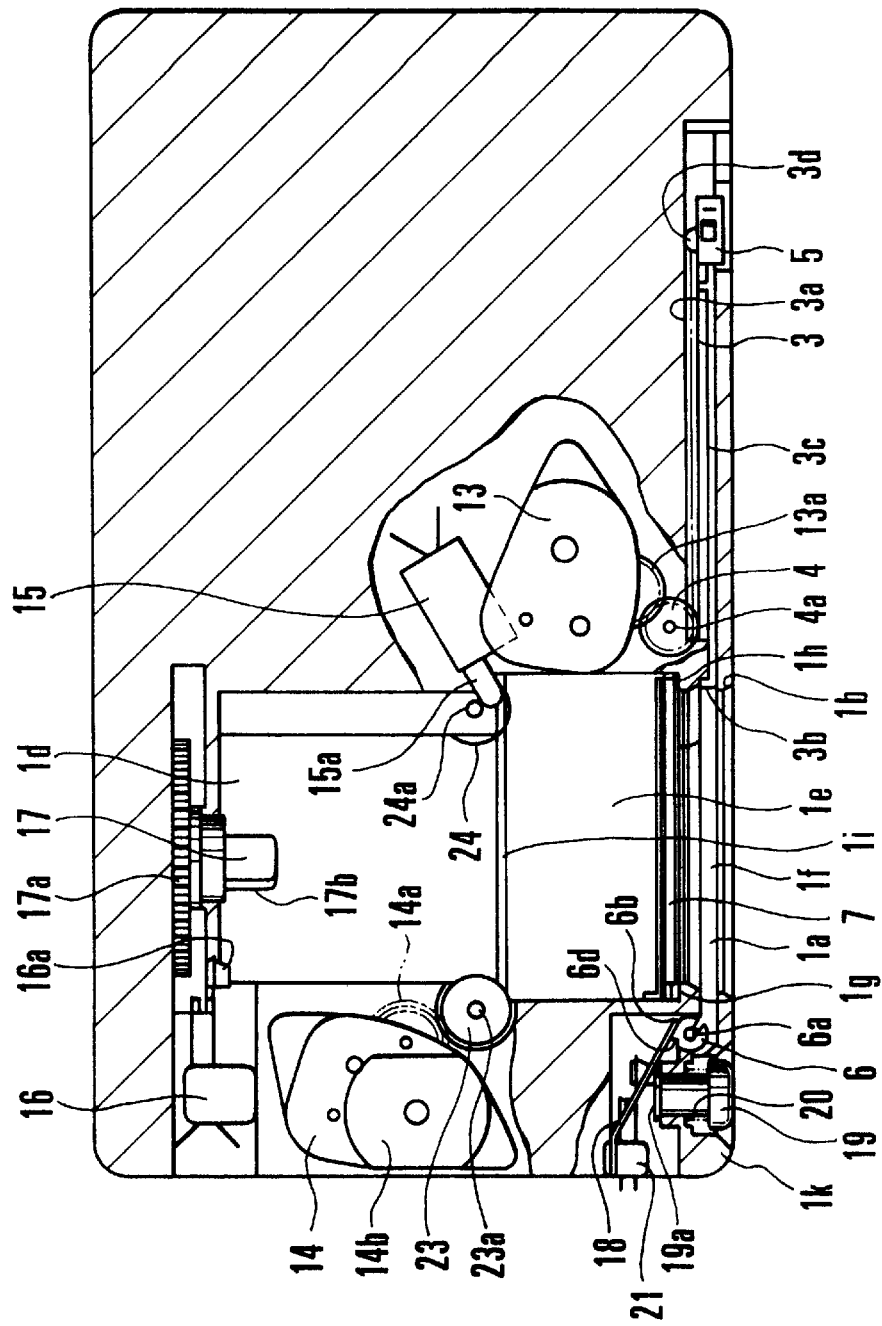
FIG. 3 is a vertical sectional view (B2—B of FIG. 5) of the camera shown in FIG. 1.
Figure 4:
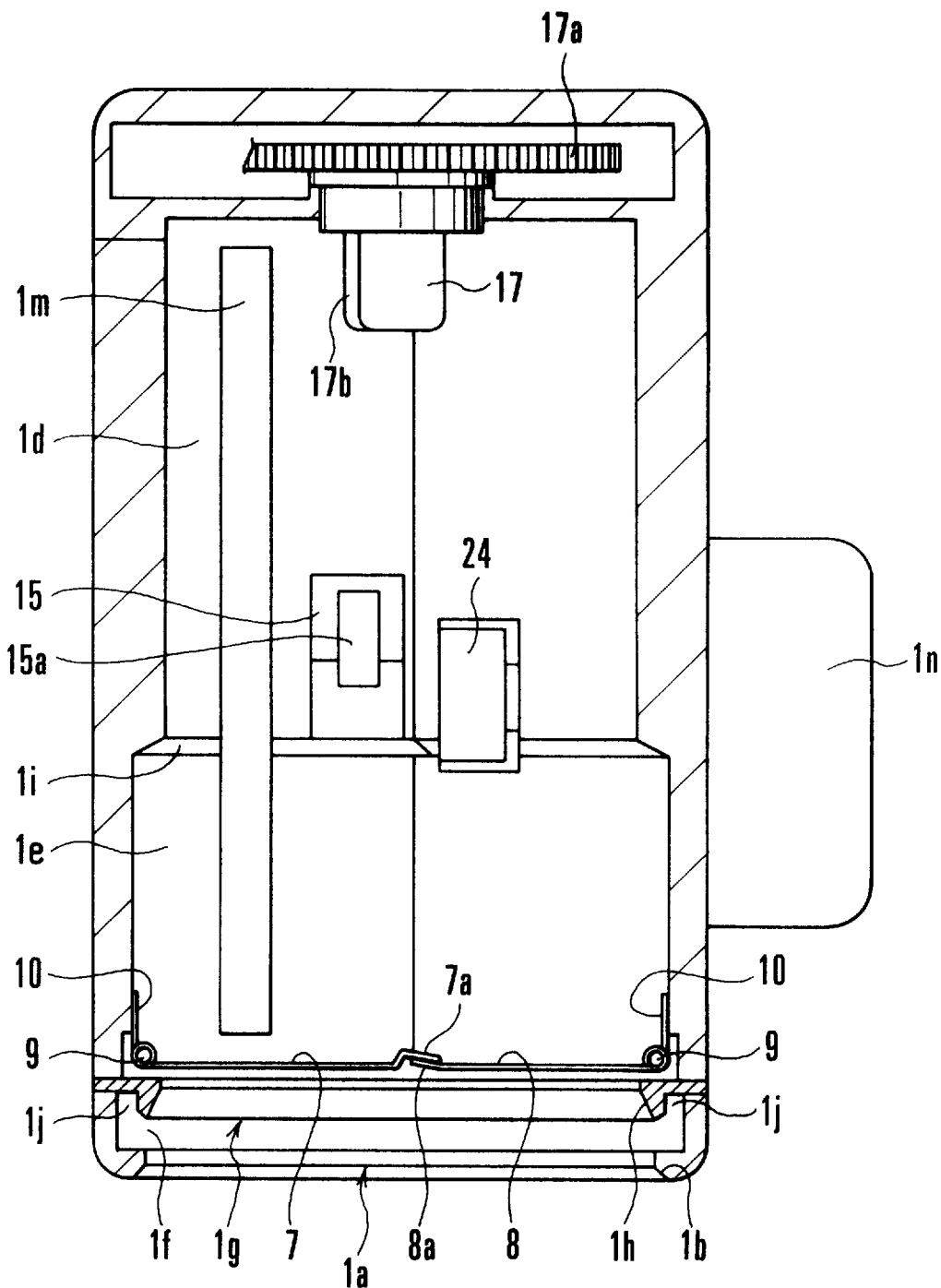
FIG. 4 is a vertical sectional view (A—A of FIG. 5) of a cartridge chamber of the camera shown in FIG. 1.
Figure 5:
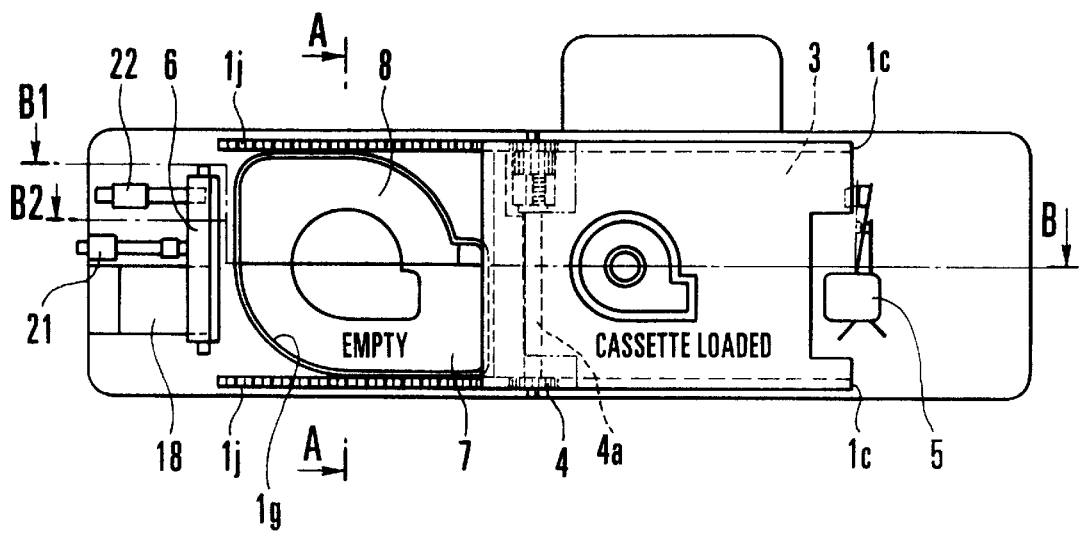
FIG. 5 is a bottom plan view showing the camera of FIG. 1 with an exterior cover being removed.
Figure 6:
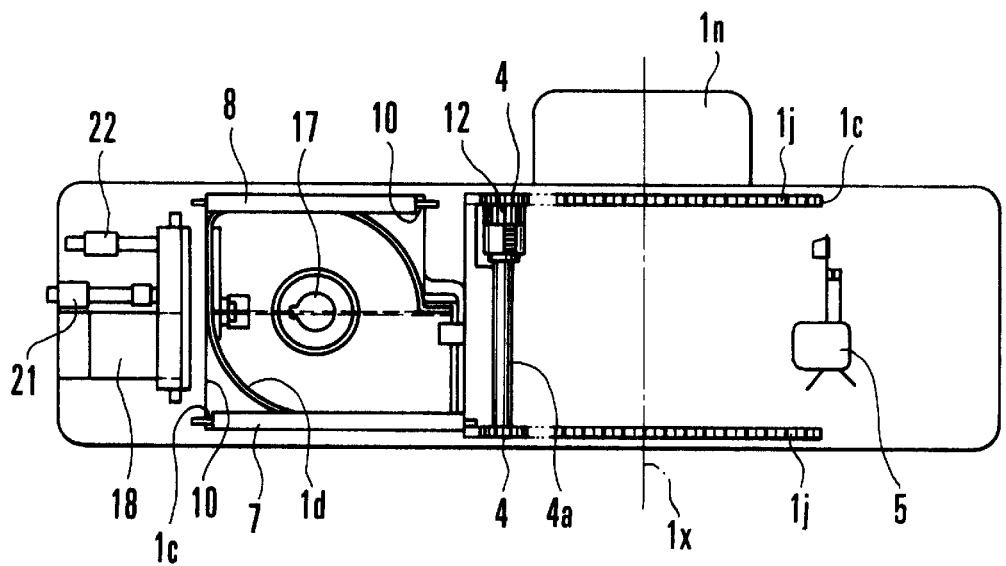
FIG. 6 is a bottom plan view showing a state in which hinged doors are forced open with the exterior cover and a slide lid being removed from the camera of FIG. 1.
Figure 7:
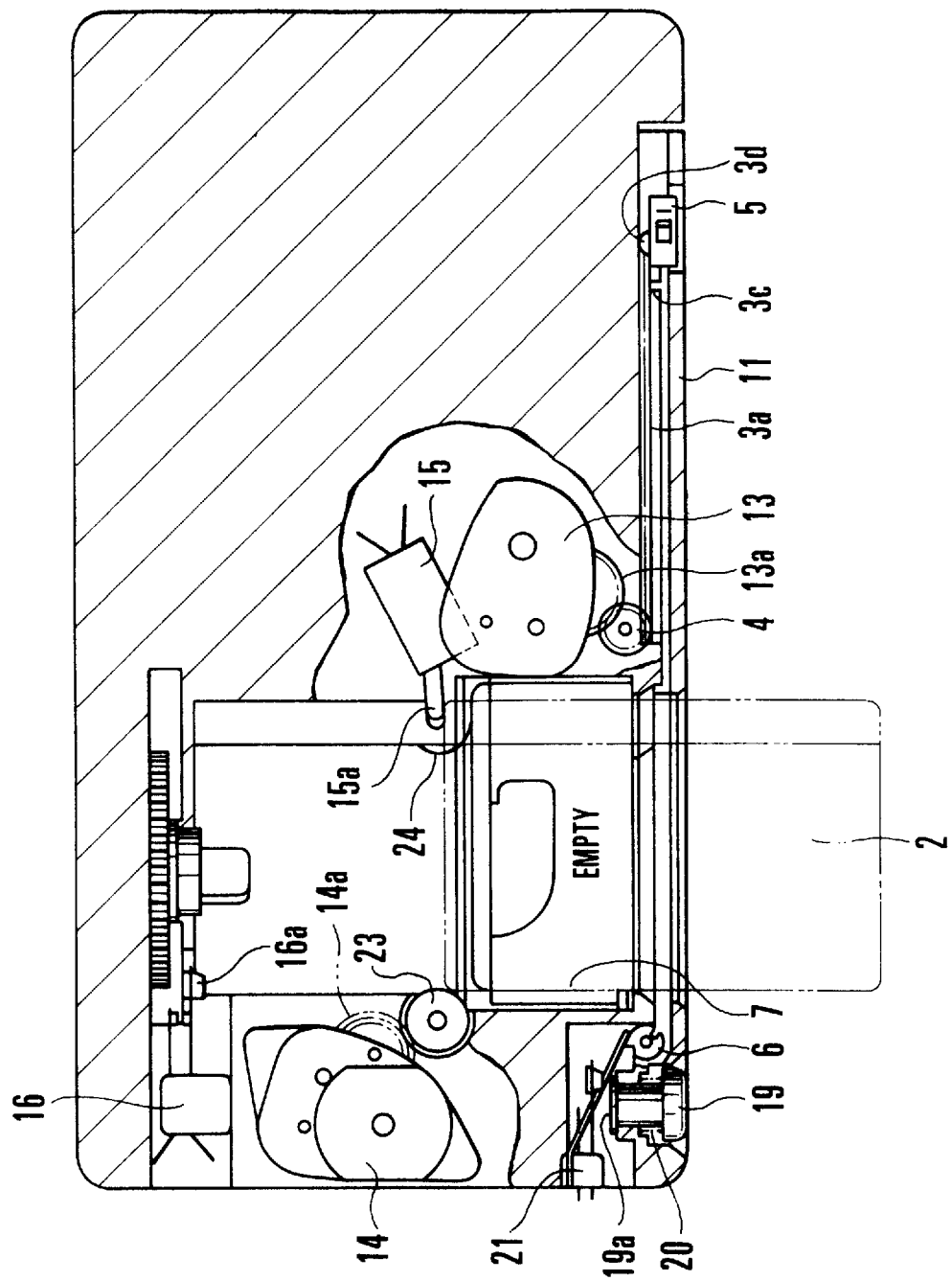
FIG. 7 is a vertical sectional view (B2—B of FIG. 5) showing a state in which a film cartridge is being inserted into or removed from the camera of FIG. 1.
Figure 8:
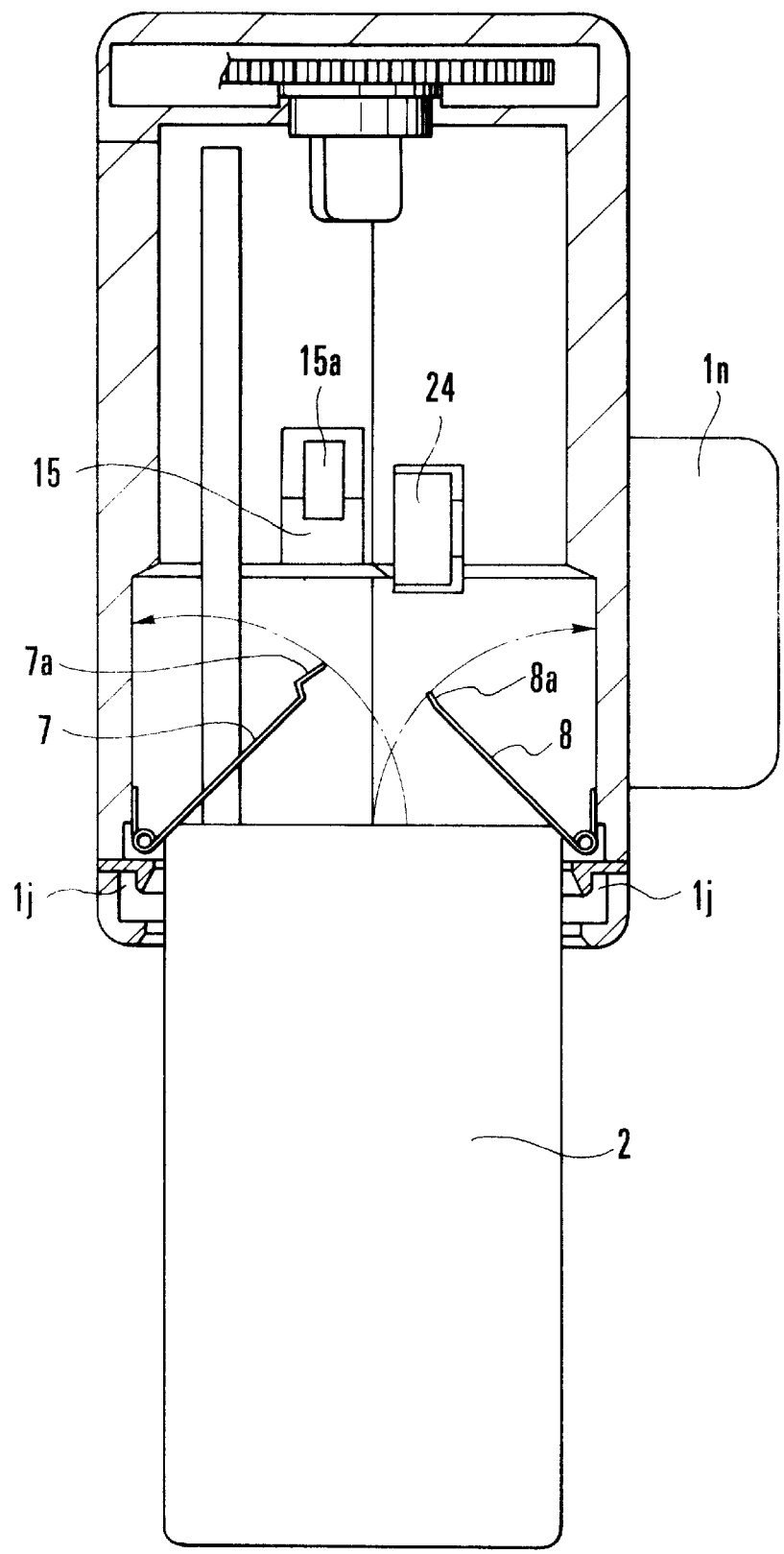
FIG. 8 is a vertical sectional view (A—A of FIG. 5) showing the state of the cartridge chamber of the camera of FIG. 1 during insertion or removal of the film cartridge.
Figure 9:
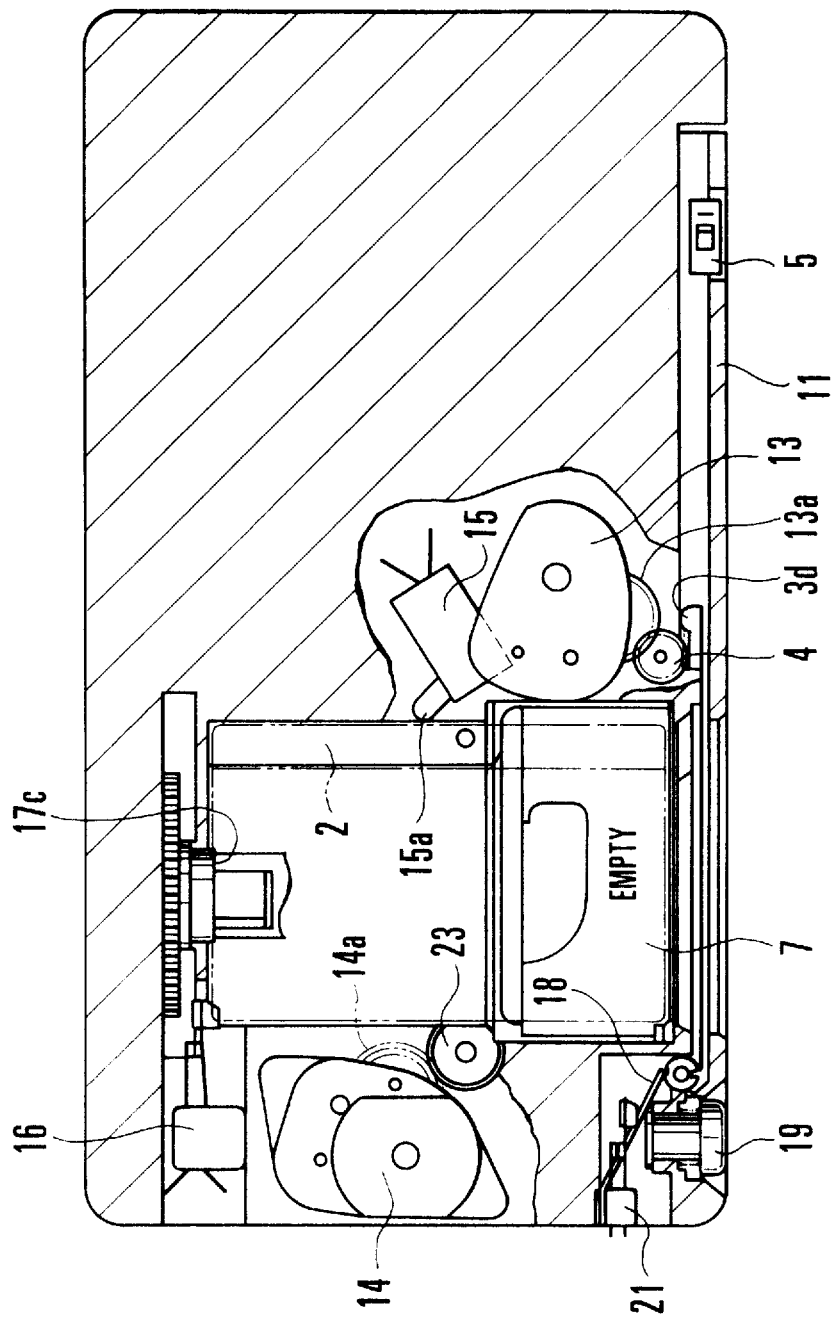
FIG. 9 is a vertical sectional view (B2—B of FIG. 5) showing a state in which the film cartridge is completely loaded in the camera of FIG. 1.
Figure 10:
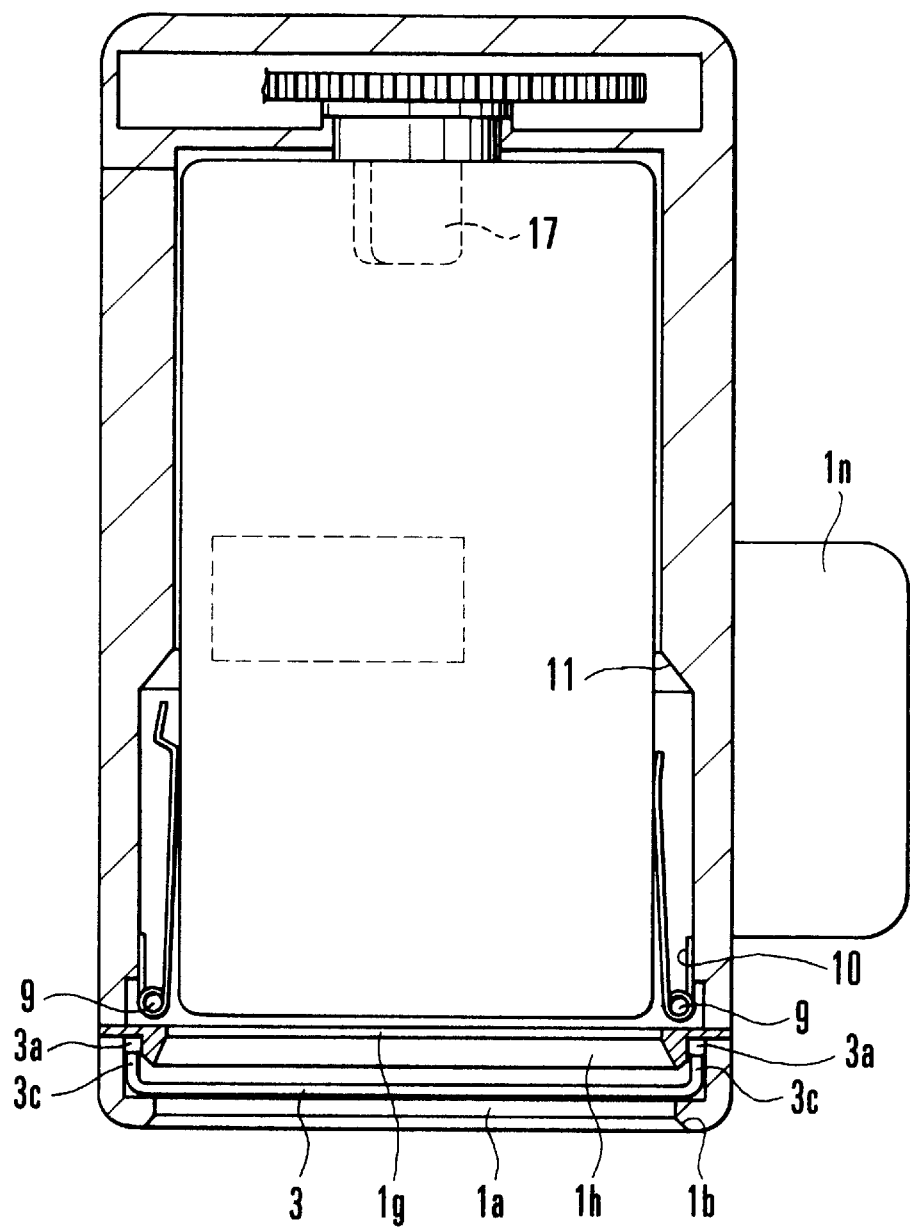
FIG. 10 is a vertical sectional view (A—A of FIG. 5) showing the state in which the film cartridge is completely loaded in the camera of FIG. 1.
Figure 11:
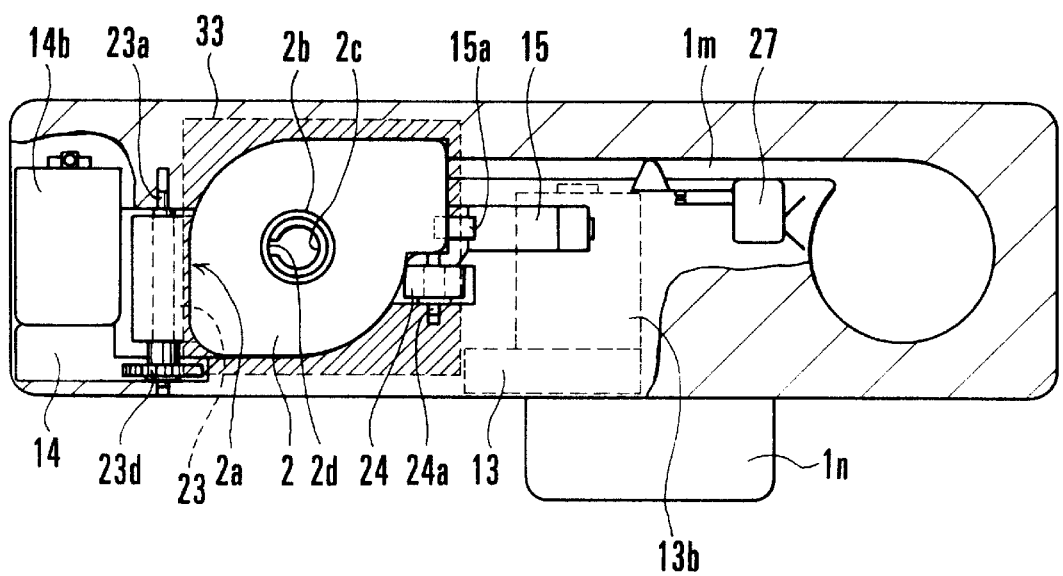
FIG. 11 is a horizontal sectional view (C—C of FIG. 1) showing the state in which the film cartridge is completely loaded in the camera of FIG. 1.
Figure 12:
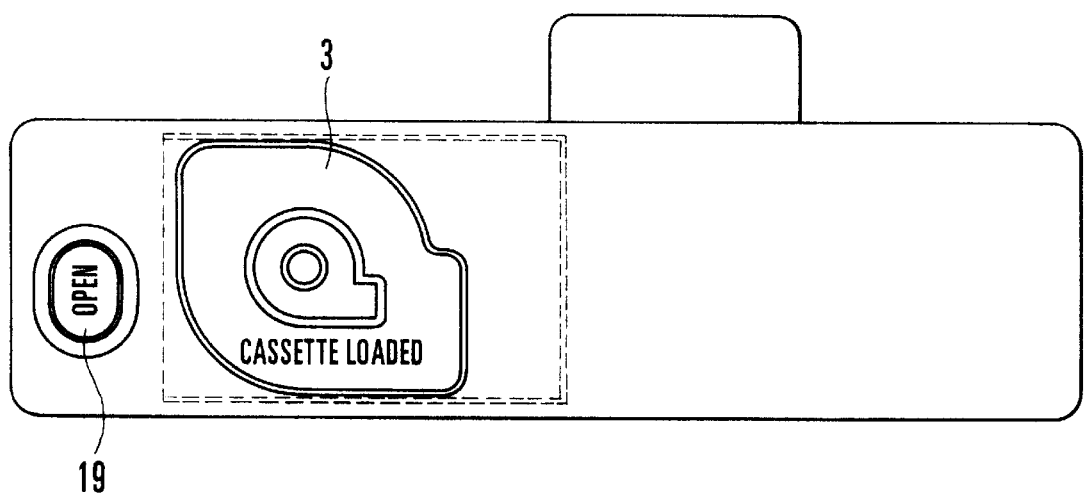
FIG. 12 is a bottom plan view showing the state in which the film cartridge is completely loaded in the camera of FIG. 1.
Figure 14A:
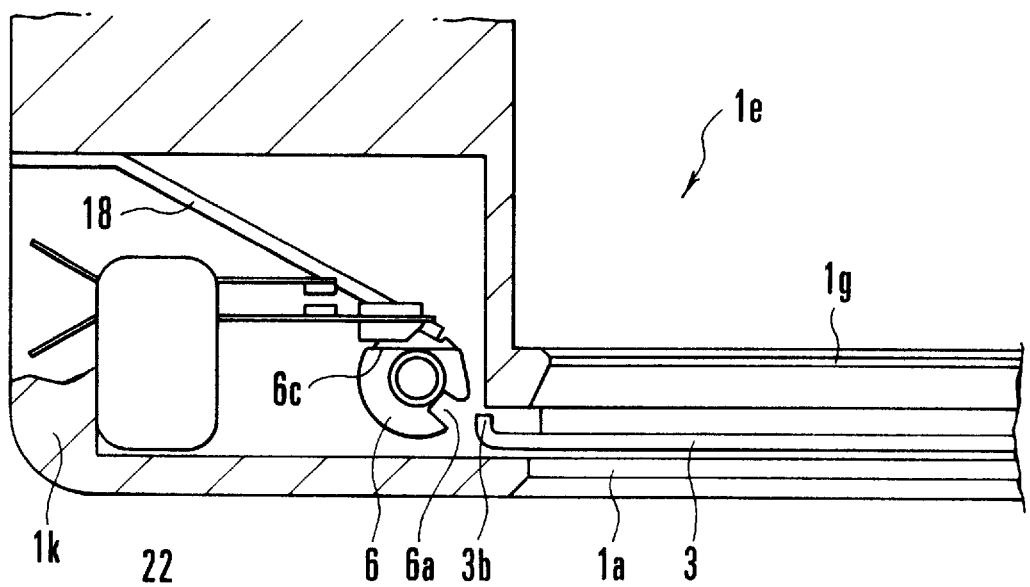
FIG. 14 is a partial cross-sectional view (B1—B of FIG. 5) showing a lock mechanism for the slide lid of the camera of FIG. 1.
Figure 14B:
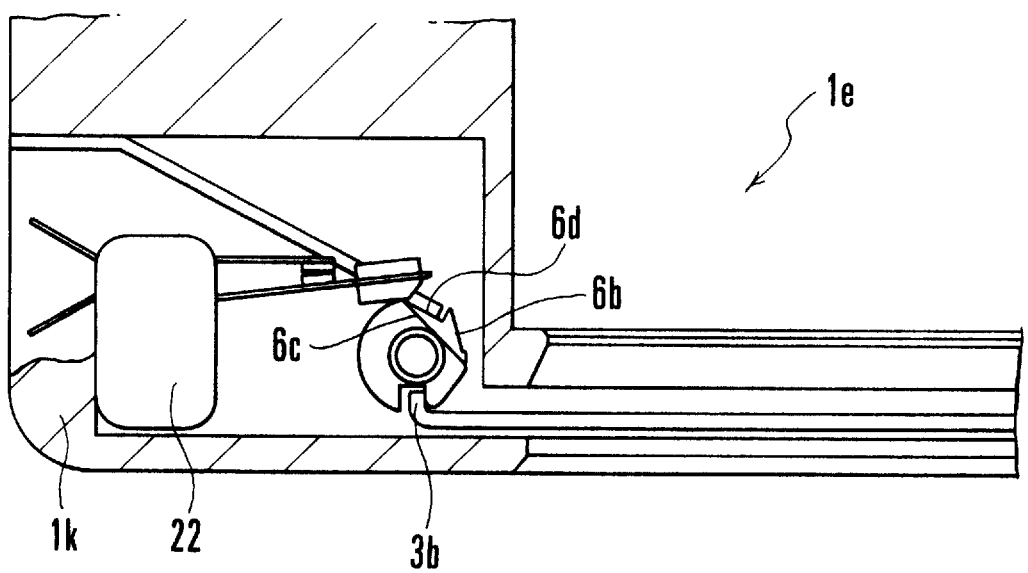
Figure 15:
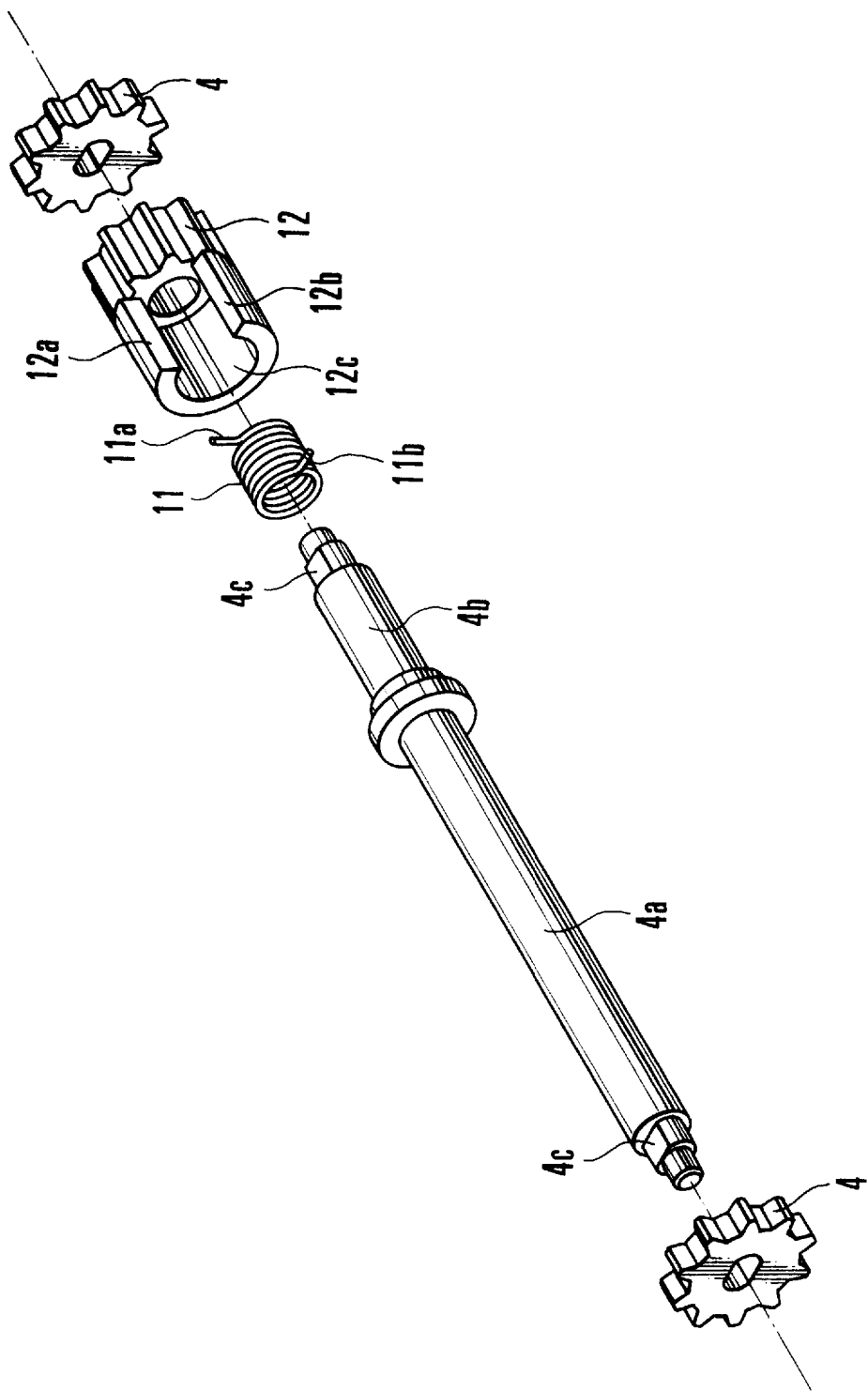
FIG. 15 is an exploded, perspective view of a slip mechanism of the camera of FIG. 1
Figure 16:
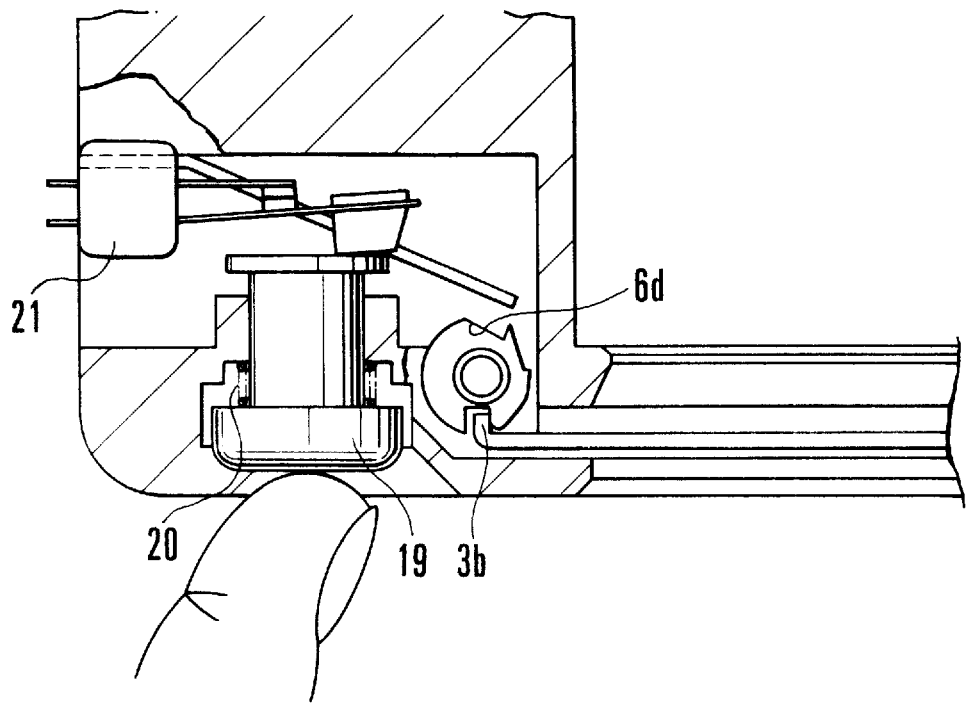
FIG. 16 is a partial cross-sectional view (B2—B of FIG. 5) showing the lock mechanism for the slide lid of the camera of FIG. 1.
Figure 17:
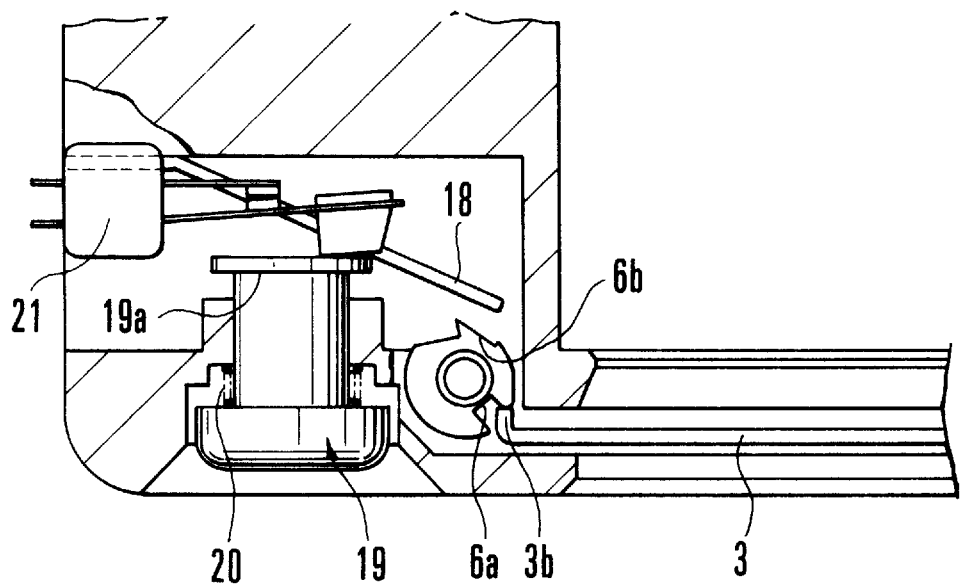
FIG. 17 is a partial cross-sectional view (B2—B of FIG. 5) showing the lock mechanism for the slide lid of the camera of FIG. 1.

FIGS. 1 to 20 are diagrammatic views showing a first embodiment of the present invention. FIG. 1 is a diagrammatic, front elevational view showing the external appearance of a camera according to the first embodiment of the present invention. FIG. 2 is a bottom plan view showing the bottom of the camera of FIG. 1 in which a cartridge inserting opening is formed. FIG. 3 is a vertical sectional view (B2—B of FIG. 5) of the camera shown in FIG. 1. FIG. 4 is a vertical sectional view (A—A of FIG. 5) of a cartridge chamber of the camera shown in FIG. 1. FIG. 5 is a bottom plan view showing the camera of FIG. 1 with an exterior cover being removed. FIG. 6 is a bottom plan view showing a state in which hinged doors are forced open with the exterior cover and a slide lid being removed from the camera of FIG. 1. FIG. 7 is a vertical sectional view (B2—B of FIG. 5) showing a state in which a film cartridge is being inserted into or removed from the camera of FIG. 1. FIG. 8 is a vertical sectional view (A—A of FIG. 5) showing the state of the cartridge chamber of the camera of FIG. 1 during insertion or removal of the film cartridge. FIG. 9 is a vertical sectional view (B2-B of FIG. 5) showing a state in which the film cartridge is completely loaded in the camera of FIG. 1. FIG. 10 is a vertical sectional view (A—A of FIG. 5) showing the state in which the film cartridge is completely loaded in the camera of FIG. 1. FIG. 11 is a horizontal sectional view (C—C of FIG. 1) showing the state in which the film cartridge is completely loaded in the camera of FIG. 1. FIG. 12 is a bottom plan view showing the state in which the film cartridge is completely loaded in the camera of FIG. 1. FIG. 13 is a perspective view of the slide lid. FIG. 14 is a partial cross-sectional view (B1-B of FIG. 5) showing a lock mechanism for the slide lid. FIG. 15 is an exploded, perspective view of a slip mechanism. FIG. 16 is a partial cross-sectional view (B2-B of FIG. 5) showing the lock mechanism for the slide lid. FIG. 17 is a partial cross-sectional view (B2-B of FIG. 5) showing the lock mechanism for the slide lid.

Referring to FIGS. 1 and 2, the shown camera includes a camera body 1, a lens 1n, a camera body cover 1k, a cartridge inserting opening 1a formed in the bottom of the camera body 1 in a shape similar to the projected shape of a film cartridge as viewed in the direction in which to insert the film cartridge, and a button 19 which is pressed for removing the film cartridge from the camera body 1.

Referring to FIG. 3, the opening end of the cartridge inserting opening 1a is surrounded by an edge face formed as a slant face 1b which is inclined outwardly at an angle of approximately 45 degrees, whereby a user can readily insert a film cartridge 2 (refer to FIG. 7) into the cartridge inserting opening 1a. A slide space 1f for a slide lid 3 is formed to extend over the bottom of the camera body 1 on the internal side of the cartridge inserting opening 1a. Each rack 3a and an associated driving gear 4 are meshed with each other, and the slide lid 3 is driven by the racks 3a and the driving gears 4 to slide within the slide space 1f, thereby opening or closing the cartridge inserting opening 1a. When the slide lid 3 is driven toward the right as viewed in FIG. 3 and the right end of the slide lid 3 comes into contact with stoppers 1c (which are shown in FIG. 5) of the camera body 1, the slide lid 3 is made to stop and an opening switch 5 is turned on at the same time. Each of the stoppers 1c consists of one end face of each light blocking groove 1j which will be described later.

Referring further to FIG. 3, a cartridge chamber id is formed to be approximately identical in shape to, but slightly larger in size than, the film cartridge 2 (refer to FIG. 6). Further, the cartridge chamber 1d is formed to extend over approximately ½ of the axial length of the film cartridge 2. A rotation space 1e is formed immediately below the cartridge chamber 1d (on the side of the cartridge chamber 1d closer to the cartridge inserting opening 1a). The rotation space 1e has a rectangular, tubular shape which is selected to circumscribe the external shape of the film cartridge 2 within an extent equivalent to approximately ½ of the axial length thereof. A pair of hinged doors 7 and 8 (refer also to FIGS. 4 and 8) are provided in the rotation space 1e in such a manner that each of the hinged doors 7 and 8 is rotatable through an angle of approximately 90 degrees. A slant face 1i is formed to allow the film cartridge 2 to smoothly travel from the rotation space 1e to the cartridge chamber 1d (refer also to FIG. 4). A cartridge inserting opening 1g is formed between the slide space 1f and the rotation space 1e, and has a shape approximately identical to that of the cartridge inserting opening 1a. A slant face 1h is formed at the top end of the cartridge inserting opening 1g so that the film cartridge 2 can be smoothly inserted into the cartridge chamber 1d (refer also to FIG. 4).

As shown in FIG. 4, hinge shafts 9 are disposed immediately above the cartridge inserting opening 1g, and the hinged doors 7 and 8 are inwardly rotatable about the respective hinge shafts 9 through an angle of approximately 90 degrees. The hinged doors 7 and 8 are respectively urged by springs 10 in the direction in which they cover the cartridge inserting opening 1g. The hinged doors 7 and 8 have a step portion 7a and an engagement portion 8b, respectively. The hinged doors 7 and 8 are arranged to be closed with the step portion 7a and the engagement portion 8b lying on each other, thereby preventing foreign matter, such as dust, from entering the camera body 1. Further, the hinged doors 7 and 8 are colored (for example, red) so that the user can visually check whether the film cartridge 2 is present in the cartridge chamber 1d. More specifically, the hinged doors 7 and 8 serve an indication function, and if the red color of the hinged doors 7 and 8 is viewed from the outside, the user can determine that the film cartridge 2 is absent in the camera body 1.

The slide lid 3 will be described below with reference to FIG. 13.

The slide lid 3 has a rectangular shape in plan view, and four walls are formed on the internal side of the slide lid 3 (on the side of the slide lid 3 which is visible in FIG. 13) in such a manner as to extend along four sides, respectively. Such four walls constitute light blocking projections 3c. The light blocking projections 3c extending along two longer sides are formed to be longer than those extending along two shorter sides, and each of the racks 3a is formed on one end face of a respective one of the former light blocking projections 3c. The shorter side on the left side as viewed in FIG. 13 constitutes a locking portion 3b. As shown in FIGS. 14(a) and 14(b), when the slide lid 3 is locked, the locking portion 3b is fitted into a locking groove 6a of a locking rotating member (which will be described later in detail) to constitute a socket and spigot structure (engagement structure), thereby blocking light. The two light blocking projections 3c are fitted into the respective light blocking grooves 1j of the camera body 1 shown in FIGS. 5 and 6, thereby constituting a movable, light blocking structure. Guide portions 3d each having a semi-circular shape in side elevation are formed at the opposite ends of each of the racks 3a. The position of the top of each of the guide portions 3d is selected to be slightly higher than the position of the top end of each tooth of the racks 3a. The guide portions 3d have the function of reducing friction by sliding in contact with the camera body 1 during an opening or closing operation of the slide lid 3.

The arrangement of the other components will be described below with reference to FIG. 3.

A lid driving motor unit 13 and a roller driving motor unit 14 respectively include small motors (the lid motor 13b and the roller motor 14b shown in FIG. 18) and speed reduction systems. The speed reduction systems have gear ratios optimum for their respective uses and serve as gear heads, and are assembled with the respective small motors. The lid motor 13b and the roller motor 14b respectively have output shafts each of which is disposed to extend approximately in parallel with a photographic optical axis 1x (refer to FIG. 6) (in a direction approximately perpendicular to a photographic plane). Output gears 13a and 14a are fixed to the respective output shafts, and are disposed in substantially the same plane. Each of the small motors 13b and 14b is reversibly driven by a driver 26 controlled by a CPU 25.

The driving gears 4, which are disposed between the cartridge inserting opening 1g and a photographic optical path which extends along the photographic optical axis 1x, serve to drive the slide lid 3, and a rotating shaft 4a for the driving gears 4 is disposed to extend approximately in parallel with the photographic optical axis 1x. The driving gears 4 are arranged integrally with a slip mechanism for protecting a drive source against overload. This slip mechanism will be described below with reference to FIG. 15.

A slip gear 12 is arranged to transmit the output from the output gear 13a by frictional force due to the tight fitting of a slip spring 11 onto a slip portion 4b of the rotating (driving) shaft 4a. The slip spring 11 is fitted into a metal part 12c in the state of being fitted onto the slip portion 4b coaxially to the driving shaft 4a, and arm portions 11a and 11b are hooked on spring hooking portions 12a and 12b, respectively. In operation, as the slip gear 12 rotates clockwise, the arm portion 11a is also rotated in the same direction to loosen the slip spring 11, the driving shaft 4a is rotated by frictional force between the slip portion 4b and the slip spring 11 so that the driving gears 4 are respectively rotated clockwise by engagement portions 4c each having two opposite flat surfaces. If a load exceeding a predetermined magnitude is applied to the driving gears 4, as by an accidental stop of the slide lid 3 during a travel (the slide lid 3 which is travelling may contact a finger inserted into the cartridge inserting opening 1a) or an overrun of the slide lid 3 at either stopper end, the slip portion 4b slips so that any damage due to such overload can be prevented. In the case of a counterclockwise rotation of the slip gear 12 as well, a similar operation is performed.

Referring back to FIG. 3, a locking rotating member 6 is supported by the camera body 1 in such a manner as to be rotatable through an angle of approximately 45 degrees about its own longitudinal axis. An angular position of approximately 45 degrees is a standby position at which the locking rotating member 6 is held by a locking spring 18 pressing a holding portion 6b.

As shown in more detail in FIGS. 14(a) and 14(b), if the slide lid 3 is closed and the locking portion 3i is inserted into the locking groove 6a which is inclined at an angle of approximately 45 degrees, the slide lid 3 immediately rotates the locking rotating member 6 in the clockwise direction. When the slide lid 3 travels further in the closing direction, the locking rotating member 6 rotates to the position at which the locking groove 6a faces directly down as shown in FIG. 14(b). At this position, the locking groove 6a and the locking portion 3b form the socket and spigot structure, and the locking spring 18 engages with a latch groove 6d to hold the locking rotating member 6 in the state shown in FIG. 14(b). At the same time, a flat portion 6c inclines to turn on a lock switch 22 so that the lock switch 22 transmits a signal indicative of the completion of the closing and locking of the slide lid 3 to the CPU 25 which will be described later.

Referring back to FIG. 3, the button 19 is vertically movably disposed at the bottom of the camera body 1, and is held at a standby position by a button spring 20 which urges the button 19 against the bottom. The button 19 has a projection 19a on its reverse side, and when the button 19 is pressed by a predetermined stroke, the projection 19a presses the locking spring 18 upwardly as viewed in FIG. 3, thereby removing the locking spring 18 from the latch groove 6d of the locking rotating member 6 (refer also to FIGS. 16 and 17). If the button 19 is pressed by a longer stroke, the projection 19a turns on a button switch 21.

Referring to FIGS. 3 and 11, a roller 23 is arranged to be reversibly rotated by a roller gear 23b. The roller 23 is prepared by fitting a cylinder made of elastic material, such as urethane or silicone rubber, onto a roller shaft 23a and fixing the cylinder to the roller shaft 23a. The surface of the roller 23 may be of any form as long as it has a high friction coefficient. For example, it is preferable that knurls or teeth be formed on a metal or plastic surface. A guide roller 24 is similarly fitted onto a roller shaft 24a having a short axial length, as clearly shown in FIG. 11. The two rollers 23 and 24 are located at opposite positions so as to clamp the film cartridge 2 in the cartridge chamber 1d, and are disposed approximately in parallel with their rotating shafts, i.e., the roller shafts 23a and 24a, as well as the photographic optical axis 1x, without increasing the thickness of the camera body 1 at all. Each of the two rollers 23 and 24 is designed to have a predetermined external diameter in the state of being fitted on the respective one of the shafts 23a and 24a. The predetermined external diameter is selected so that when the film cartridge 2 is inserted into the cartridge chamber 1d, the elastic rubber portion can be compressed by a predetermined amount to generate a sufficient frictional torque to allow the film cartridge 2 to smoothly rise (loading of the film cartridge 2) or lower (removal of the film cartridge 2) by the roller 23 being rotated forwardly or backwardly by the roller motor 14b.

The roller 23 and the guide roller 24 are located at a height equivalent to approximately ½ of the height of a space in which to load the film cartridge 2. The axis of the roller 23 may be completely or approximately perpendicular to a film transporting plane in terms of the function of the roller 23. To cause the film cartridge 2 to travel efficiently, the roller 23 is disposed to be pressed against a flat portion 2a (refer to FIG. 11) of the external shape of the film cartridge 2 which is located on the side opposite to the guide roller 24, so that the roller 23 is in pressure contact with the flat portion 2a over a fully large length (the length of a shorter side of the film cartridge 2). The length of the roller 23 is selected to be equal to or slightly shorter than the length of the flat portion 2a. The guide roller 24 is disposed below a film drawing opening (in contact with a flat portion of a step formed in the vicinity of the film drawing opening) within the area of a rectangle 33 which approximately circumscribes the external shape of the film cartridge 2.

The external surface of the roller 23 is formed to have an appropriate, elastic rubber hardness. Accordingly, even if the output of the roller driving motor unit 14 is directly inputted to the roller gear 23b, a slip occurs between the elastic surface of the roller 23 and the surface of the film cartridge 2 so that a driving system can be prevented from being damaged when high load is applied to the roller 23.

Referring back to FIG. 3, a mechanical, insertion detecting switch 15 has a detecting arm 15a which projects into the cartridge chamber 1d by a predetermined amount on the internal side of the hinged doors 7 and 8. The height of the detecting arm 15a is selected so that the insertion detecting switch 15 can be turned on when the bottom end of the film cartridge 2 reaches the vicinity of a position where it comes into contact with the roller 23. The bottom end of the film cartridge 2 comes into contact with the roller 23 by being pressed by a predetermined stroke after the bottom end has passed through the cartridge inserting openings 1a and 1g and forced the hinged doors 7 and 8 to open. A cartridge detecting switch 16 for detecting whether the film cartridge 2 is present is disposed at a position where the cartridge detecting switch 16 can be turned on by the arm 16a being pressed upward when the film cartridge 2 is completely held at a predetermined position. A known type of fork 17 is provided for winding or rewinding a film. When the fork 17 engages with an engagement hole 2c formed in a winding spool 2b of the film cartridge 2 (refer to FIG. 11), a key 17b is fitted into a key groove 2d, and then a fork gear 17a is rotated through a gear train (not shown) to cause the fork 17 to perform winding or rewinding of the film.

Referring back to FIG. 11, a film detecting switch 27 for detecting whether the film is present is disposed above a film path lm along which to guide the film drawn from the film cartridge 2 toward a film winding spool (not shown). The film detecting switch 27 is on while the film is drawn from the film cartridge 2, whereas if the film is accommodated in the film cartridge 2 or exposure light is blocked, the film detecting switch 27 is off.

Figure 18:
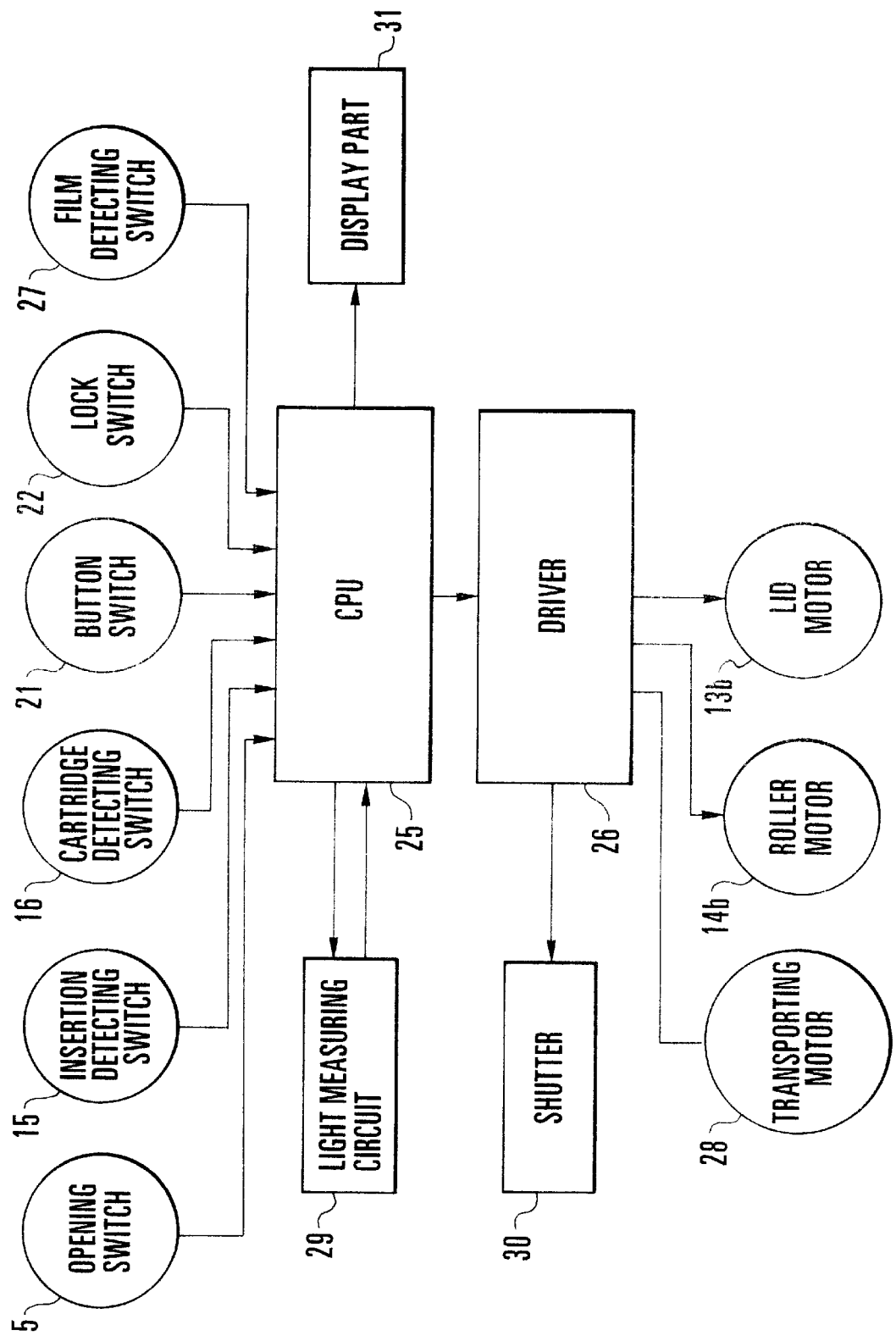
FIG. 18 is a block diagram showing the circuit arrangement of the essential portion of the camera according to the first embodiment of the present invention.

FIG. 18 is a block diagram showing the circuit arrangement of the essential portion of the camera having the above-described arrangement.

Referring to FIG. 18, the CPU 25 is arranged to detect, in addition to the respective states of the above-described switches (5, 15, 16, 21, 22 and 27), the states of other switches (not shown), and drive the driver 26 (which will be described later) and other associated elements on the basis of the detection results. The driver 26 is controlled by the CPU 25, and causes each of a film transporting motor 28, the lid motor 13b and the roller motor 14b to rotate forwardly or backwardly, or stops the forward or backward rotation of each of the motors 28, 13b and 14b.

A light measuring circuit 29 is provided for measuring the luminance of a subject, and a shutter 30 is driven and controlled to perform correct exposure of film on the basis of luminance information outputted from the light measuring circuit 29. A display part 31, such as an LCD, is provided for displaying predetermined kinds of statuses, such as the presence or absence of the film cartridge 2.

Figure 19:
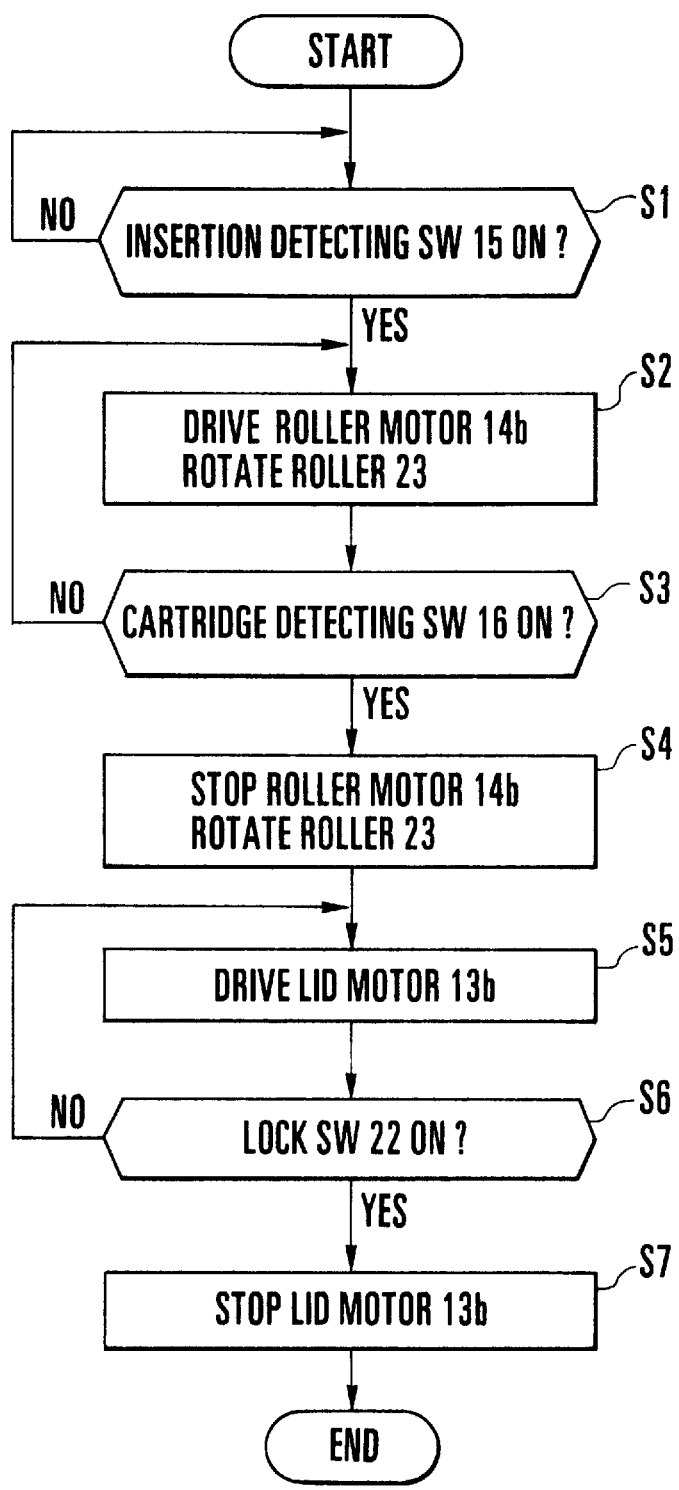
FIG. 19 is a flowchart of the operation of the CPU of FIG. 18 for loading a film cartridge.
Figure 20:
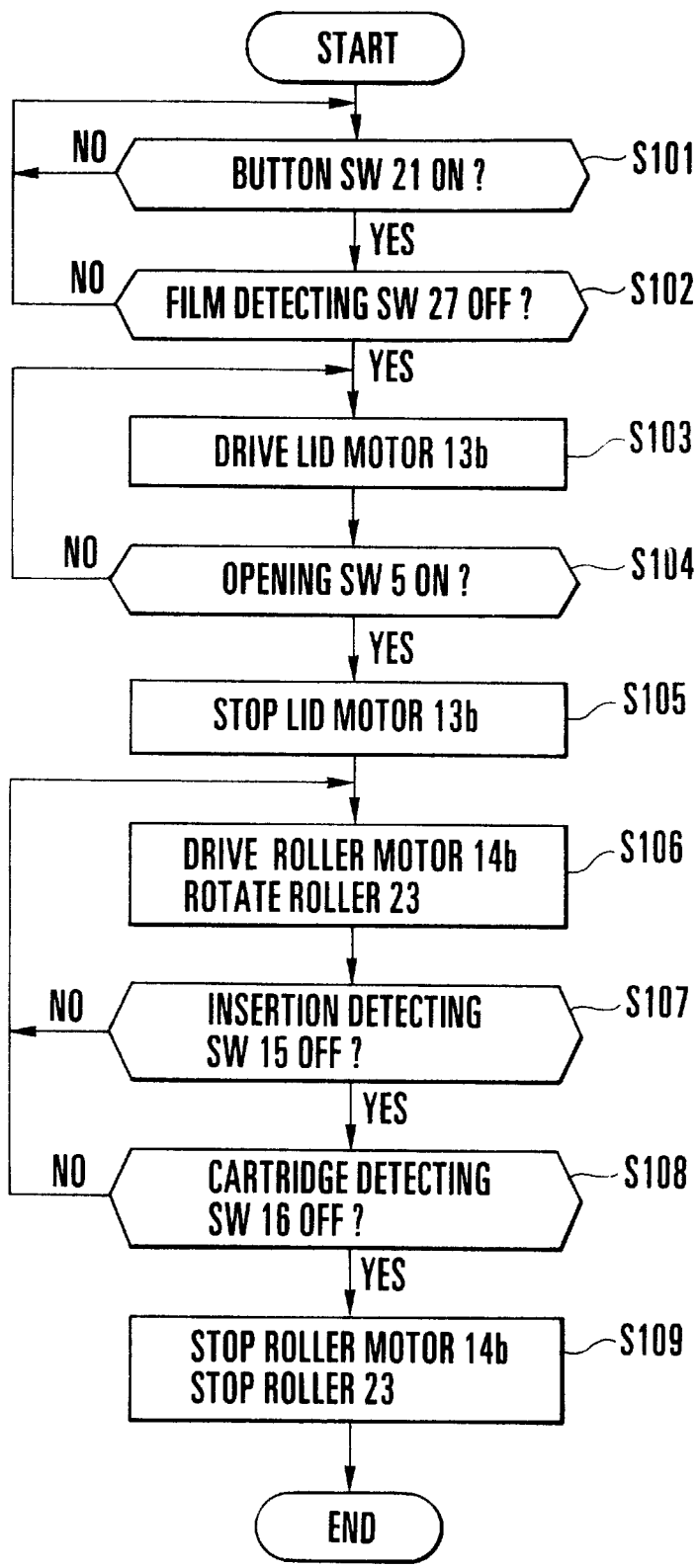
FIG. 20 is a flowchart of the operation of the CPU of FIG. 18 for removing the film cartridge.
Figure 21:
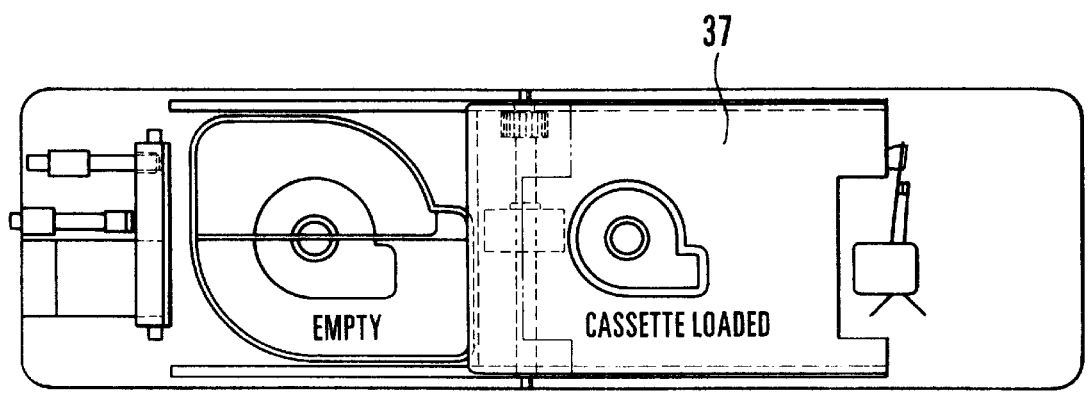
FIG. 21 is a bottom plan view of a camera according to a second embodiment of the present invention with an exterior cover removed from the camera.

The operation of loading the film cartridge 2 and the operation of removing the film cartridge 2 from the cartridge chamber 1d will be described below with reference to the flowcharts of FIGS. 19 and 20.

Incidentally, FIGS. 3 to 6 show the state of the camera which is ready for loading of the film cartridge 2. FIGS. 7 and 8 show an initial state of the operation of loading the film cartridge 2 and a state of the operation of removing the film cartridge 2. FIGS. 9 to 12 show the state of the completion of the loading operation. FIG. 14(a) shows the states of the locking rotating member 6 and the associated elements immediately before the slide lid 3 is completely closed, and FIG. 14(b) shows the state in which the slide lid 3 is completely closed.

The operation of loading the film cartridge 2 will first be described below with reference to the flowchart of FIG. 19. In the following description of each of the flowcharts, the term "step" is referred to simply as "S".

The operation of loading the film cartridge 2 is similarly performed irrespective of whether a main switch (not shown) of the camera is on or off. As will also be apparent from the following description, if the film cartridge 2 is not loaded, the slide lid 3 is placed in the open state shown in FIG. 7 (the cartridge inserting opening 1a is open) and the hinged doors 7 and 8 which are colored to serve the indication function of indicating that the film cartridge 2 is absent in the camera body 1 are placed in the state of closing (covering) the cartridge inserting opening 1a, i.e., the state shown in FIG. 2 as viewed from the bottom of the camera.

During the above-described state, the user inserts the film cartridge 2 into the double cartridge inserting openings 1a and 1g while causing it to travel in accordance with the shape of the double cartridge inserting openings 1a and 1g (refer to FIG. 8). During an initial period of this operation, when the film cartridge 2 comes into contact with the portions of the red, hinged doors 7 and 8 that lie on each other, the user feels a slight resistance, but may force the hinged doors 7 and 8 open by pressing the film cartridge 2. Thus, the film cartridge 2 comes into contact with the detecting arm 15a of the insertion detecting switch 15 (the state shown in FIG. 7). When the user further presses the film cartridge 2 against the torque of the detecting arm 15a, the insertion detecting switch 15 is turned on, so that the CPU 25 detects that the loading of the film cartridge 2 into the cartridge chamber 1d has been started (S1).

When detecting the start of the loading of the film cartridge 2 into the cartridge chamber 1d, the CPU 25 transmits to the driver 26 a signal indicative of an instruction to drive the roller motor 14b in the forward direction. The driver 26 causes the roller motor 14b to rotate the output gear 14a shown in, for example, FIG. 3 in the clockwise direction, thereby causing each of the roller gear 23b and the roller 23 to rotate in the counterclockwise direction (S2). Thus, the inserted end of the film cartridge 2 is clamped between the roller 23 and the guide roller 24 and the roller 23 feeds the film cartridge 2 in the state of being held in pressure contact with the flat portion 2a thereof. In this manner, the film cartridge 2 is drawn into the cartridge chamber 1d.

Specifically, when the film cartridge 2 is inserted through the cartridge inserting opening 1a against the resistance of the hinged doors 7 and 8, the insertion detecting switch 15 is turned on so that the roller 23 starts to draw the film cartridge 2 into the cartridge chamber 1d. Since this drawing operation is instantaneously executed, the film cartridge 2 is automatically drawn into the cartridge chamber 1d halfway during the loading operation. Incidentally, while the film cartridge 2 is accommodated, the insertion detecting switch 15 is normally on.

When the film cartridge 2 rises in the cartridge chamber 1d by being driven by the roller 23 and guided by the guide roller 24, as shown in FIG. 10, the fork 17 is first guided by a chamfered portion of the engagement hole 2c of the winding spool 2b of the film cartridge 2 and engages with the engagement hole 2c. The film cartridge 2 further rises while being centered by the fork 17. When the inserted end of the film cartridge 2 reaches the top end of the cartridge chamber 1d, the cartridge detecting switch 16 is turned on as shown in FIG. 9 (S3). The CPU 25 detects that the film cartridge 2 has been loaded in a predetermined position, and stops the roller motor 14b (S4).

Even if an overrun occurs owing to an inertia or the like of the roller motor 14b at the time of the stop of the roller motor 14b, a slip occurs between the roller 23 and the surface of the film cartridge 2, so that the driving system is prevented from being damaged. While the roller motor 14b is stopped, the roller 23 is substantially unable to rotate owing to the gear ratio of the speed reduction system. Accordingly, the film cartridge 2 is prevented from travelling owing to a vibration or the like.

Then, the CPU 25 transmits to the driver 26 a signal indicative of an instruction to drive the lid motor 13b in the forward direction (S5). The output of the output gear 13a is transmitted to the driving gear 4 through the slip mechanism made up of the slip gear 12 and the aforesaid associated elements, thereby causing the driving gear 4 to rotate in the clockwise direction and driving the slide lid 3 toward the left as viewed in FIG. 9. The opening switch 5 is turned off, and the slide lid 3 closes the cartridge inserting opening 1a. During this operation, even if a finger or foreign matter happens to hinder the travel of the slide lid 3, a slip occurs between the slip gear 12 and the driving gear 4, thereby preventing the finger or the driving system from being damaged. By removing such foreign matter, the slide lid 3 restarts travelling and closes the cartridge inserting opening 1a.

Immediately before the slide lid 3 is completely closed, since the locking rotating member 6 is in the state of inclining the locking groove 6a in the direction of an angle of approximately 45 degrees, the locking portion 3b of the slide lid 3 is fitted into the locking groove 6a. The locking rotating member 6 is made to rotate by the slide lid 3 through an angle of approximately 45 degrees against the pressure applied to the holding portion 6b by the locking spring 18. At the time when the locking groove 6a faces directly down as shown in FIG. 14(a), the locking spring 18 engages with the latch groove 6d to mechanically lock the locking rotating member 6, thereby stopping the rotation of the locking rotating member 6.

In this state, the locking portion 3b and the locking groove 6a form the socket and spigot structure for blocking light. Since the flat portion 6c turns on the lock switch 22 (S6), the CPU 25 detects that the slide lid 3 has been completely closed and mechanically locked, and immediately stops the lid motor 13b via the driver 26 (S7).

After that, the CPU 25 causes the display part 31 to display information indicative of the completion of the loading of the film cartridge 2, and drives the film transporting motor 28 for the purpose of starting transporting the film, thereby executing a film transporting operation. When the film is transported to and held in a photographing position, the shutter 30 is driven in response to the manipulation of a release button and a photographing operation is executed.

Since the rotational speed of the lid motor 13b is reduced at a large speed reduction ratio, even if the slide lid 3 is erroneously moved, the driving gear 4 does not move beyond a backlash. However, since there is a possibility that the slip gear 12 gradually rotates, it is necessary to mechanically lock the slide lid 3 by means of the locking rotating member 6.

During photography, since the film detecting switch 27 shown in FIG. 11 is turned on by the film drawn from the film cartridge 2, the CPU 25 can detect the film being drawn from the film cartridge 2.

When the film cartridge 2 is completely accommodated into the camera, the user can readily confirm the loading of the film cartridge 2 by viewing the characters "CASSETTE LOADED" represented in color on the exposed surface of the slide lid 3 (as well as by means of a variation in the state of the cartridge inserting opening 1a).

In the above-described process, merely by inserting the film cartridge 2 through the cartridge inserting opening 1a in the bottom of the camera by a distance equivalent to approximately ½ of the entire axial length of the film cartridge 2, the subsequent operations are automatically executed, i.e., the film cartridge 2 is transported to and held in the predetermined position, then the slide lid 3 is closed, and then an initial, film transporting operation is performed. Thus, a preliminary operation for photography is completed.

The operation of removing the film cartridge 2 after the completion of exposure of the film will be described below with reference to the flowchart of FIG. 20.

This operation proceeds in a sequence which is generally opposite to the above-described operation. For better understanding, the operation of pressing the button 19 for removing the film cartridge 2 is shown in FIG. 16, and a state in which the button 19 is further pressed is shown in FIG. 17.

After photography has been completed by a predetermined number of exposures, the fork 17 is driven by means of the film transporting motor 28 to rewind the film. When the film is rewound and accommodated into the film cartridge 2, the film detecting switch 27 is turned off and the CPU 25 determines that the incidence of light on the film is blocked.

During this state, if the button 19 is pressed as shown in FIG. 16 for the purpose of removing the film cartridge 2, the button 19 is pressed inwardly up to a first stroke position to remove the locking spring 18 from the latch groove 6d of the locking rotating member 6, whereby the mechanical lock is released.

When in this state, the button 19 can return to its initial position at any time if the user removes the finger from the button 19. When the button 19 is pressed further inwardly up to a second stroke position, the button switch 21 is turned on by the projection 19a (S01). When the CPU 25 detects that the film detecting switch 27 has been turned off and the button switch 21 has been turned on (S102), the CPU 25 drives the lid motor 13b via the driver 26 to cause the slide lid 3 to travel toward the right as shown in FIG. 17 (S103). Thus, the locking portion 3b rotates the locking rotating member 6 in the counterclockwise direction, so that the mechanical lock is released.

After that, when the slide lid 3 travels up to its right end, the opening switch 5 is turned on (S104) and the CPU 25 stops the lid motor 13b (S105). Then, the CPU 25 drives the roller motor 14b via the driver 26 to rotate the roller 23 in the clockwise direction, so that the roller 23 kept in pressure contact with the flat portion 2a starts an unloading operation to gradually unload the film cartridge 2 outwardly (S106). During this time, the slide lid 3 is held at its open end with the opening switch 5 remaining on, on the basis of a torque relationship determined by the speed reduction ratio of the gear train.

The roller 23 continues to rotate, causing the film cartridge 2 to lower. When the film cartridge 2 partly projects from the bottom of the camera body 1 as shown in FIG. 7, the insertion detecting switch 15 is switched from its on state to its off state and the CPU 25 detects this switching (S107). Further, if the CPU 25 detects that the cartridge detecting switch 16 has been turned on (S108), the CPU 25 determines that the unloading of the film cartridge 2 has been completed, and stops the roller motor 14b via the driver 26, i.e., stops the rotation of the roller 23 (S109).

At this time, since the film cartridge 2 is released from the clamping between the roller 23 and the guide roller 24, the user can remove the film cartridge 2 by grasping with his/her fingers the portion of the film cartridge 2 which has projected from the camera body 1.

When the film cartridge 2 is removed, the hinged doors 7 and 8 which have been forced open as shown in FIG. 8 are returned to their initial positions by the restitution forces of the respective springs 10 to cover the cartridge inserting opening 1g.

The operations of loading and removing the film cartridge 2 are performed in the above-described manner.

In other words, in the case of the loading of the film cartridge 2, when the film cartridge 2 is directly inserted into the camera body 1, the succeeding loading operation and slid-lid closing operation are automatically performed. In the case of the removal of the film cartridge 2, the film cartridge 2 is immediately forced out merely by pressing the button 19. Accordingly, it is possible to readily remove the film cartridge 2.

A second embodiment of the present invention will be described below. In the following description, for the sake of simplicity, no reference is made to constituent elements substantially identical to the above-described ones of the first embodiment.

FIGS. 21 to 24 are views showing the second embodiment, and FIGS. 21, 22, 23 and 24 correspond to FIGS. 5, 6, 7 and 4, respectively. In FIGS. 21, 22, 23 and 24, identical reference numerals are used to denote constituent elements substantially identical to those used in the above-described first embodiment.

Figure 22:
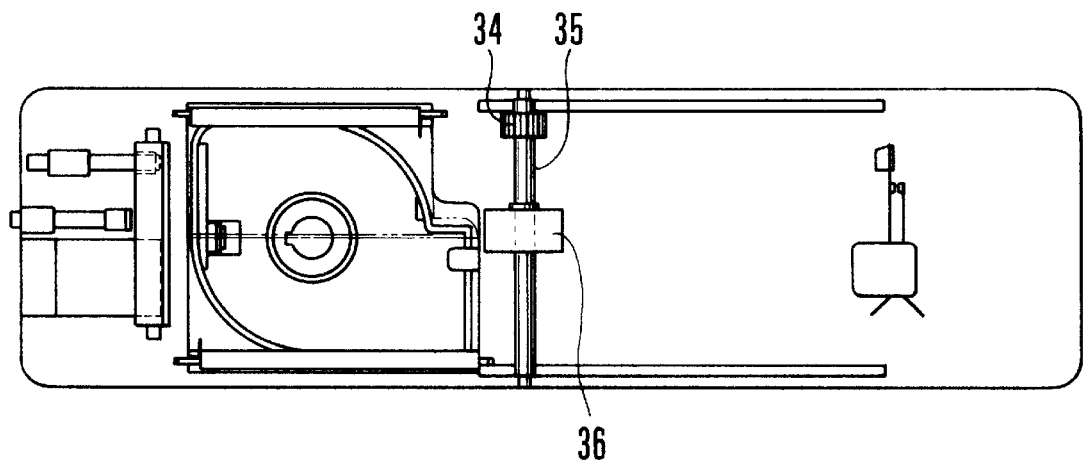
FIG. 22 is a bottom plan view of the camera of FIG. 21 with the exterior cover and a lid removed and hinged doors forced open.
Figure 23:
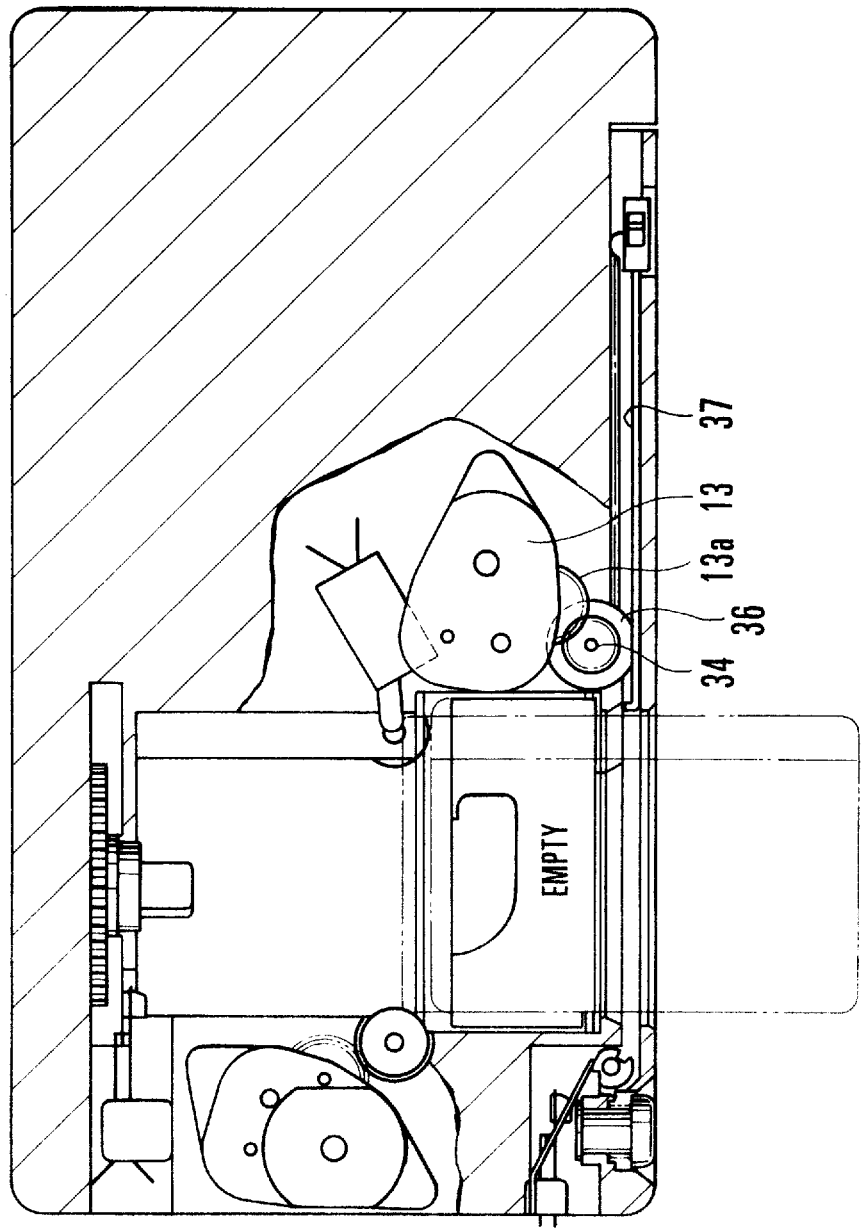
FIG. 23 is a vertical sectional view showing a state in which the film cartridge of the camera of FIG. 21 is completely inserted.
Figure 24:
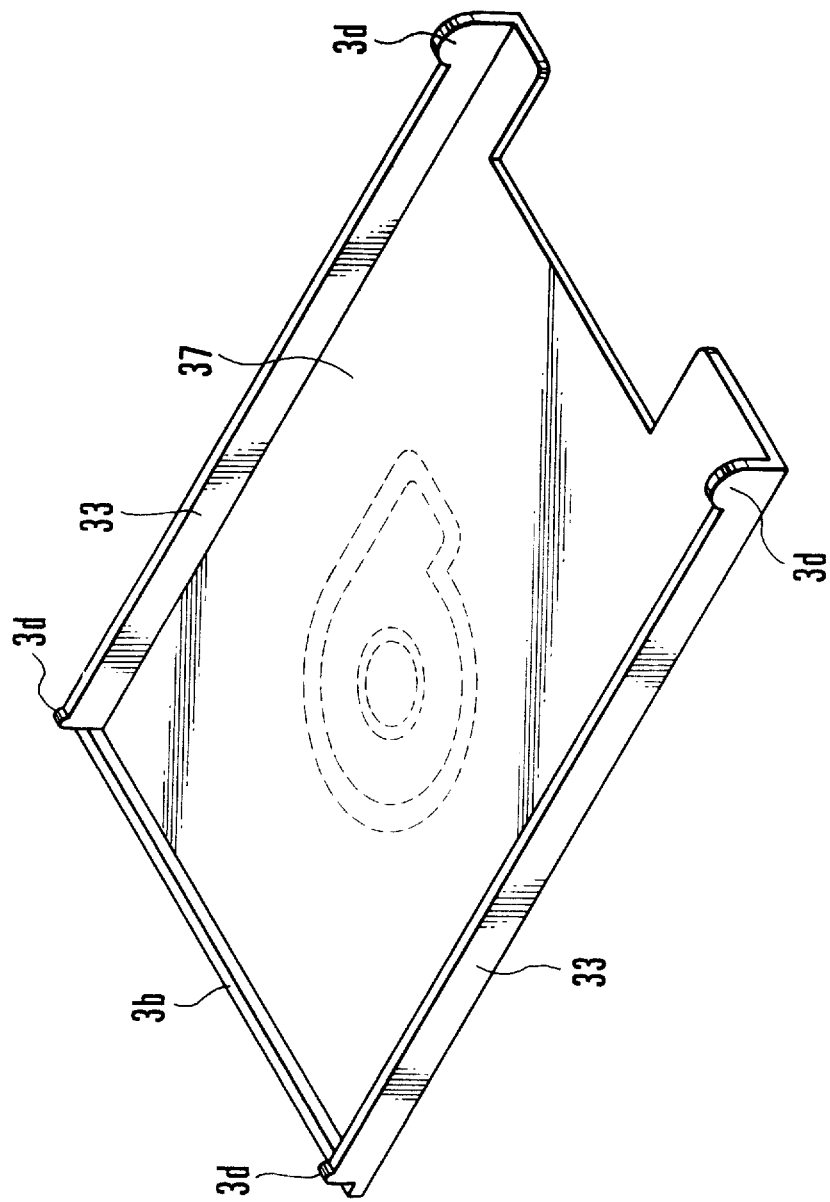
FIG. 24 is a perspective view of the slide lid of the camera of FIG. 21.

The second embodiment relates to another method for driving the slide lid 3. As shown in FIG. 22, a gear 34 is fixed to a driving shaft 35 which is a rotating shaft disposed approximately in parallel with the photographic optical axis. The driving force of the lid driving motor unit 13 shown in FIG. 23 is transmitted to the gear 34 via the output gear 13a, and is then transmitted to a lid transporting roller 36 which is fixed to the driving shaft 35. The lid transporting roller 36 is an elastic roller made of silicone rubber, urethane rubber or the like. To transport a slide lid 37 as shown in FIG. 23, the lid transporting roller 36 is maintained in pressure contact with the slide lid 37 in the state of being compressed to such an extent that a sufficient torque can be produced. As shown in FIG. 24, the slide lid 37 has ribs 33 formed to extend along two opposite sides, and each of the ribs 33 has the function of blocking light and the function of a guide rail. The ribs 33 are respectively fitted in the light blocking grooves 1j of the camera body 1 so that the slide lid 3 can be made to travel in opposite directions.

The function and operation of the second embodiment will be described below. In the following description, no reference is made to functions or operations substantially identical to the above-described ones of the first embodiment. The sequence of the operation of the second embodiment is completely the same as that of the operation of the first embodiment. Referring to FIG. 23, during a loading operation, after the film cartridge 2 has been completely accommodated into the cartridge chamber 1d, the lid motor 13b is driven to rotate in the forward direction and the output of the output gear 13a is transmitted to the lid transporting roller 36, so that the slide lid 37 is driven to move toward the left by a frictional torque between the slide lid 37 and the flat portion 2a (S5). During the driving of the slide lid 37, even if an excessive load is applied to the slide lid 37, a slip occurs between the lid transporting roller 36 and the slide lid 37 so that the driving system and other associated elements can be prevented from being damaged. This function works after the slide lid 37 has been completely closed, or when the slide lid 37 comes into contact with a stopper of the camera body 1 at the time of occurrence of an overrun of the slide lid 37 after the slide lid 37 has been completely opened. The subsequent operation is similar to the above-described operation of the first embodiment.

A third embodiment of the present invention will be described below.

Figure 25:
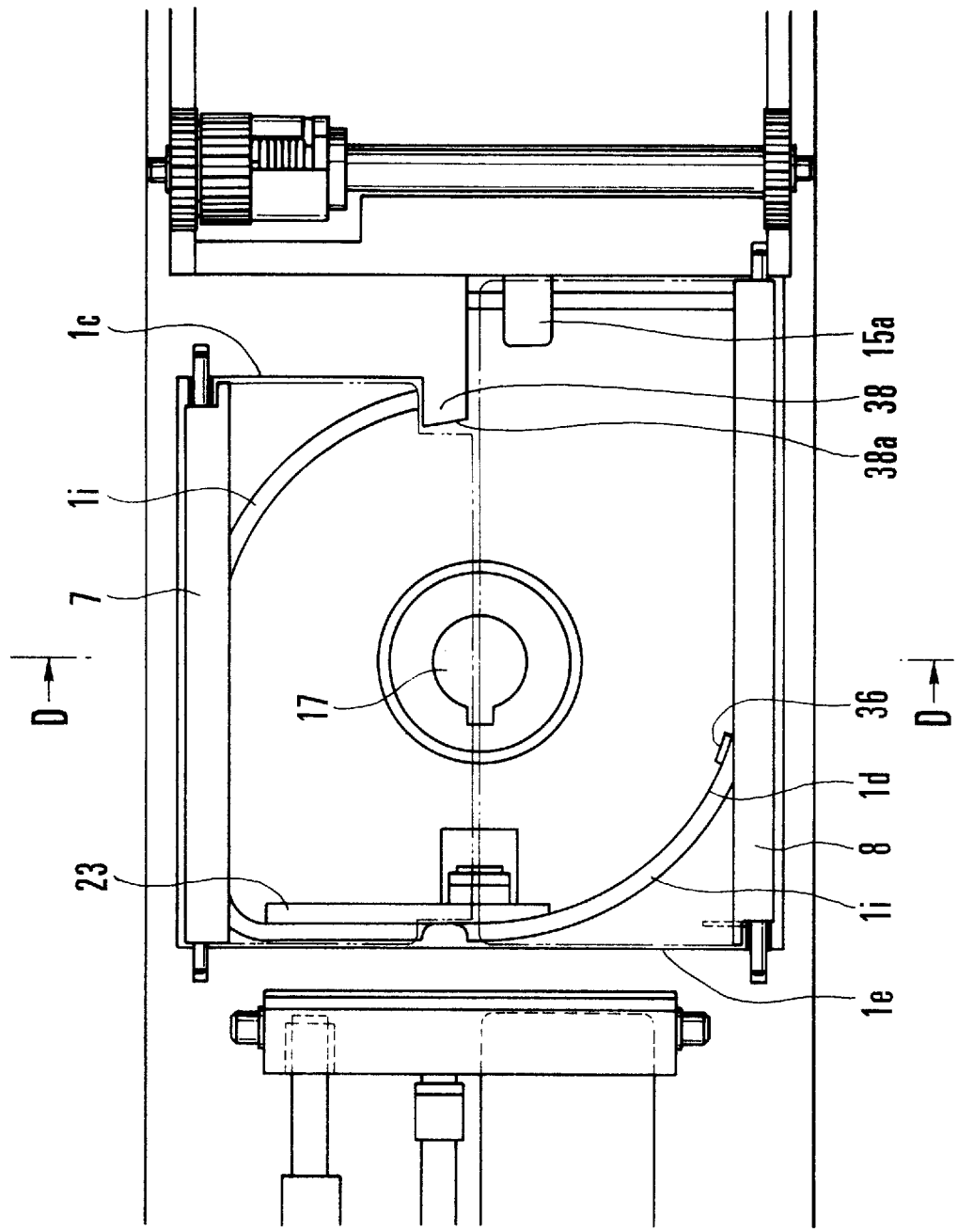
FIG. 25 is an enlarged view of a cartridge inserting opening formed in the bottom of a camera according to a third embodiment of the present invention.
Figure 26:
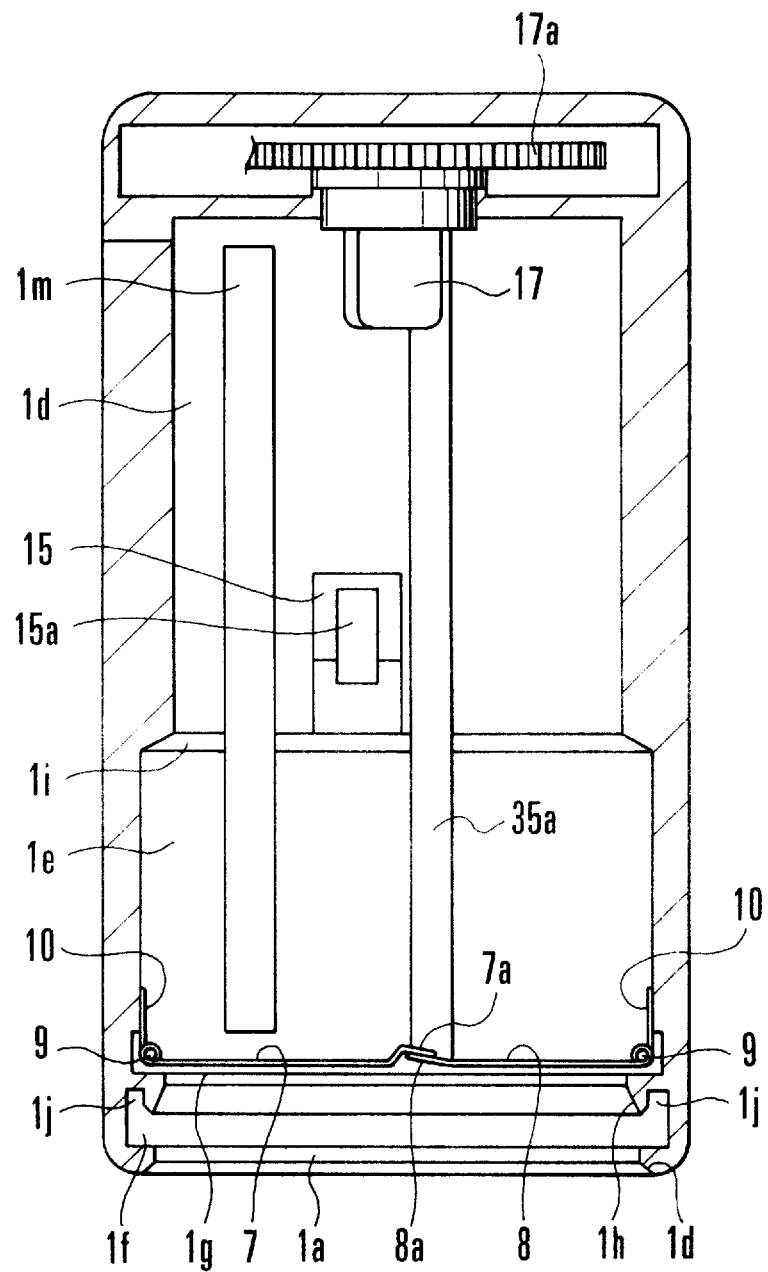
FIG. 26 is a cross-sectional view taken along line D—D, of a cartridge chamber of the camera shown in FIG. 25.
Figure 27:
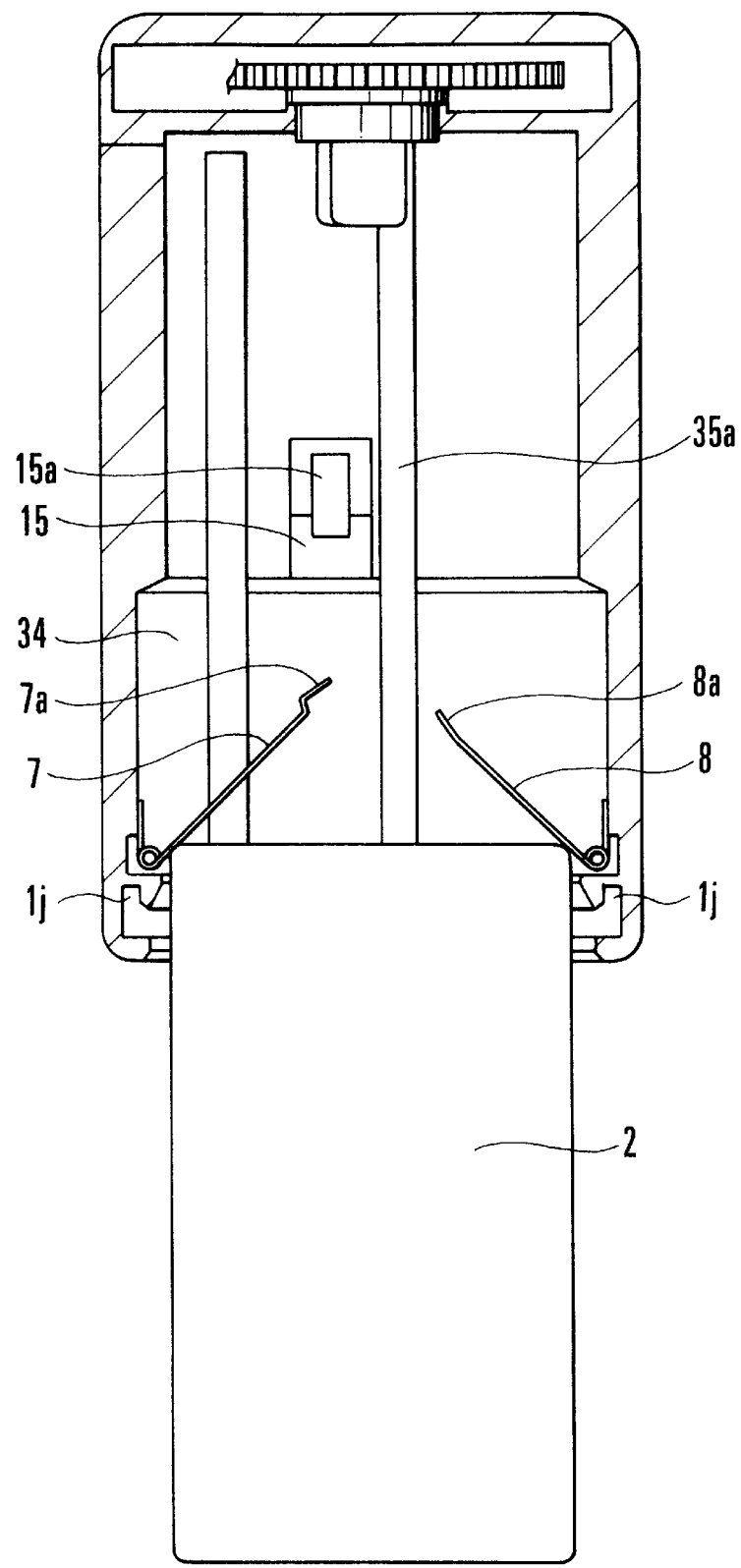
FIG. 27 is a vertical sectional view showing a state in which a cartridge is being inserted into the camera shown in FIG. 25.

FIG. 25 is an enlarged view of a cartridge inserting opening formed in the bottom of a camera according to the third embodiment of the present invention. FIG. 26 is a cross-sectional view taken along line D-D, of a cartridge chamber of the camera shown in FIG. 25. FIG. 27 is a vertical sectional view showing a state in which a cartridge is being inserted into the camera shown in FIG. 25. In these figures, identical reference numerals are used to denote constituent elements substantially identical to the above-described ones of the first embodiment.

In the third embodiment, a guide rail 38 having a smooth, slide face 38a is substituted for the guide roller 24 used in the first embodiment. The driving shaft 35 serves a function equivalent to the guide roller 24.

Specifically, the film cartridge 2 is transported upwardly or downwardly by the driving force of the slide lid 3 with one side face of the film cartridge 2 being pressed against the guide rail 38. The other operation and sequence are substantially identical to those of the first embodiment.

Figure 28:
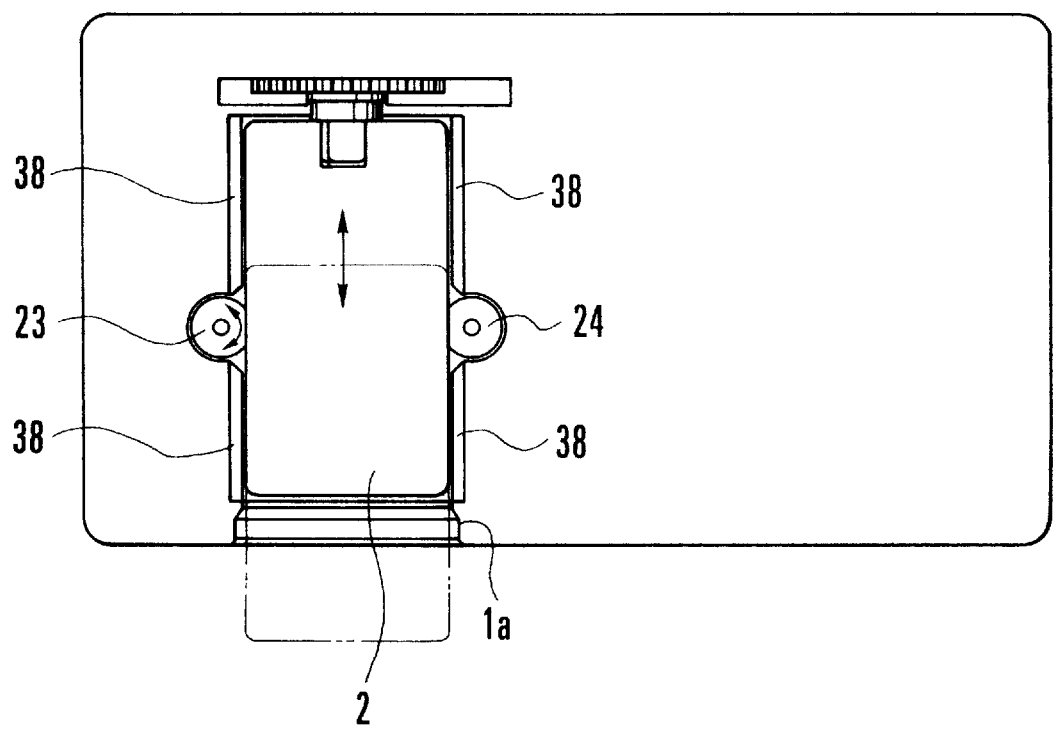
FIG. 28 is a vertical sectional view showing a cartridge chamber of a camera according to a fourth embodiment of the present invention.

FIG. 28 is a vertical sectional view of a cartridge chamber of a camera according to a fourth embodiment of the present invention. In FIG. 28, identical reference numerals are used to denote constituent elements substantially identical to the above-described ones of the first embodiment.

Figure 29:
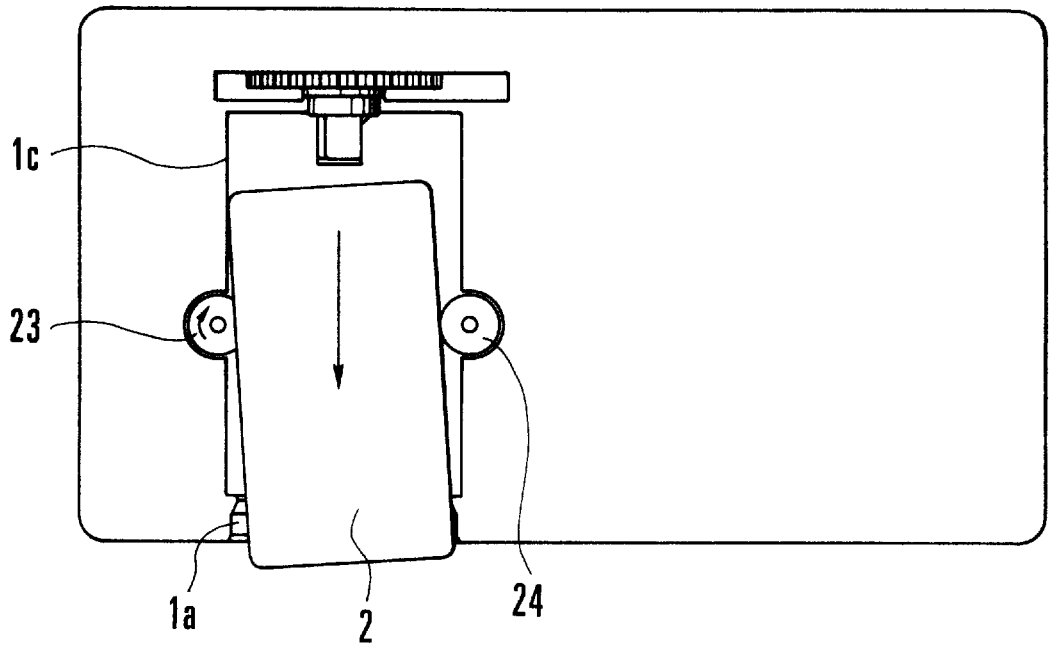
FIG. 29 is an explanatory view showing an inclination of a film cartridge which is being removed from the camera of FIG. 28.
Figure 30:
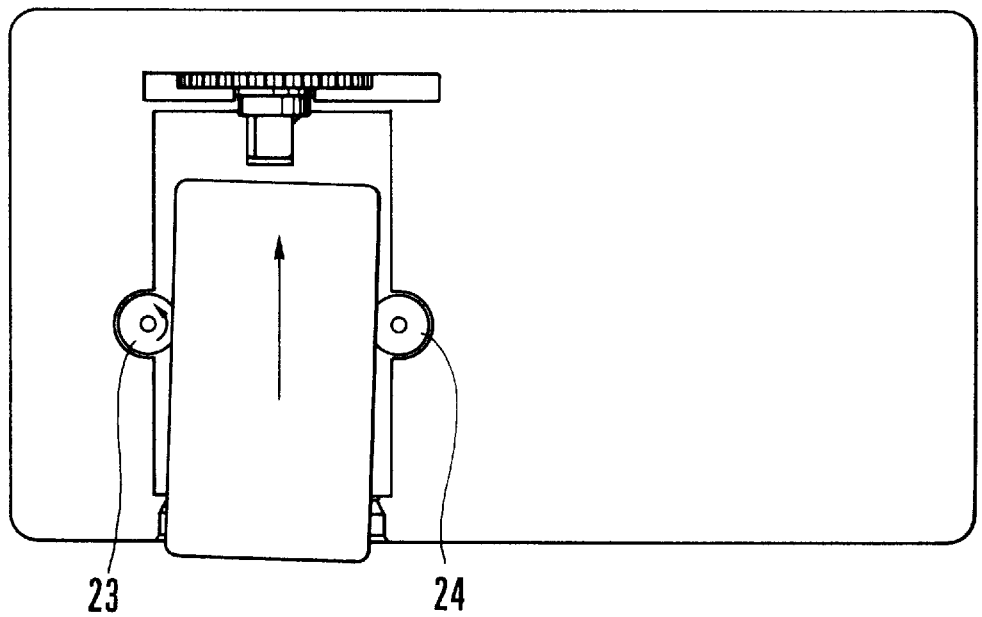
FIG. 30 is an explanatory view showing an inclination of the film cartridge which is being loaded into the camera of FIG. 28.

The fourth embodiment is intended to prevent a trouble from occurring when a cartridge is being removed or loaded in an inclined state, such as that shown in FIG. 29 (an explanatory view of an inclination occurring during cartridge removal) or FIG. 30 (an explanatory view of an inclination occurring during cartridge loading). As shown in FIG. 28, two guide rails 38 are respectively disposed above and below each of the roller 23 and the guide roller 24 for the purpose of guiding the film cartridge 2. With this arrangement, it is possible to minimize the inclination of the film cartridge 2 which is caused by the roller 23 or 24 during removal or loading.

Although not specifically shown, it is also possible to achieve a similar effect by disposing a plurality of guide rollers instead of the guide rails 38.

A fifth embodiment of the present invention will be described below.

Figure 31:
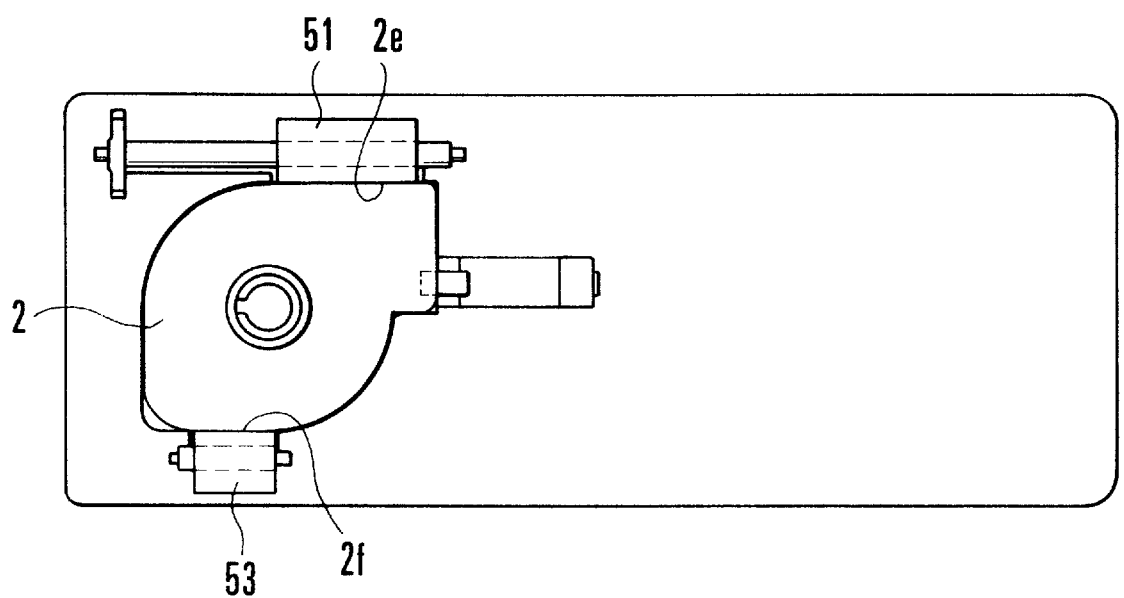
FIG. 31 is a horizontal sectional view of a camera having a cartridge chamber according to a fifth embodiment of the present invention.

FIG. 31 is a horizontal sectional view of a camera having a cartridge chamber according to the fifth embodiment of the present invention. In FIG. 31, identical reference numerals are used to denote constituent elements substantially identical to those used in the above-described first embodiment.

Referring to FIG. 31, a driving roller 51 is provided for transporting the film cartridge 2 upwardly and downwardly. A guide roller 53 is disposed at a position opposite to the driving roller 51 across the film cartridge 2. The material and the construction of each of the rollers 51 and 53 are selected to be identical to those described previously in connection with the first embodiment.

In operation, the driving roller 51 serves a function identical to the roller 23 of the first embodiment, while the guide roller 53 serves a function identical to the guide roller 24. The driving roller 51 and the guide roller 53 are respectively brought into pressure contact with flat portions 2e and 2f which are formed near the film drawing opening of the film cartridge 2. The film cartridge 2 is transported upwardly or downwardly in the state of being clamped between the driving roller 51 and the guide roller 53 at the respective flat portions 2e and 2f. The flat portion 2e which leads to the film drawing opening is a flat portion which any kind of film cartridge has. Since the other operation is substantially identical to that of the first embodiment, description thereof is omitted.

In the fifth embodiment, the driving roller 51 and the guide roller 53 are disposed in such a manner that their respective rotational axes are perpendicular to the photographic optical axis (parallel with the photographic plane), and, in addition, the guide roller 53 can be maintained in contact with the flat portion 2f over a long distance compared to any of the above-described embodiments. Accordingly, it is possible to improve the force with which the rollers 51 and 53 clamp the film cartridge 2 as well as the efficiency with which the driving roller 51 transports the film cartridge 2. In addition, since no roller is provided outside the cartridge chamber 1d, other units of the camera can be laid out outside the cartridge chamber id, and the longitudinal size of the camera body is reduced. In addition, whether each of the rollers 51 and 53 is parallel with, or slightly inclined from, the film transporting plane, no functional problem takes place.

In accordance with one of the above-described embodiments, since the rotational axis of a roller for transporting a film cartridge is laid out in parallel with the optical axis of a photographic optical axis of a camera, it is possible to realize a mechanism for loading and removing the film cartridge by means of the roller, without influencing the thickness of the camera. Accordingly, it is possible to provide a compact camera having a compact, automatic cartridge loading mechanism.

A lid for covering a cartridge inserting opening is made to travel in a flat plane by means of a rack and a pinion or a lid transporting roller, and the driving shaft of the pinion or the lid transporting roller is disposed in parallel with the photographic optical axis, so that the thickness of the camera can be prevented from being increased. Since the driving shaft of the pinion or the lid transporting roller is also parallel with the rotational axis of the cartridge transporting roller, the driving shafts of all rollers can be secured to the same base plate or all gears can be disposed on the same base plate. Accordingly, it is possible to arrange such driving shafts and gears as one gear unit, whereby the efficiency of assembly can be improved.

Since the driving shaft of a slide lid is located approximately in the central position of the bottom of the camera that is close to the optical axis of the camera, it is possible to minimize the moving range of the slide lid by minimizing the size of the slide lid. Accordingly, it is possible to reduce in the entire size of the camera.

Since a guide roller is disposed at a position opposite to the roller for transporting the film cartridge, the driving force of the roller is fully transmitted to the film cartridge, whereby it is possible to smoothly load or remove the film cartridge.

By substituting a guide rail having a smooth slide face for the guide roller, the efficiency of space utilization can be improved and a film loading unit can be made up of a reduced number of components. Accordingly, it is possible to realize an electrically powered cartridge loading type of camera without increasing the size and the cost of the camera.

Since the direction in which an internal lid is opened is parallel with the longitudinal direction of the camera, the interference between the lid and the cartridge transporting roller can be minimized. Accordingly, the cartridge transporting roller and an insertion detecting switch can be disposed closer to the cartridge inserting opening, so that it is possible to reduce the initial stroke required to manually insert the film cartridge into the camera and the smoothness of electrically-powered loading is prevented from being impaired.

Since two guide rails are respectively disposed above and below each roller on the wall of a cartridge chamber or small-diameter rollers are arrayed in the form of a rail, it is possible to prevent an inclination or an accidental stop of the film cartridge due to the rotational force of the rollers. A similar effect can be obtained by substituting a plurality of small-diameter rollers for the guide rails.

Since the hinge axis of each internal lid is disposed to extend in the longitudinal direction of the camera, it is possible to dispose the cartridge transporting roller, the guide roller and the insertion detecting switch outside the rotating area of the internal lid at a position closest to the cartridge insertion opening. When the film cartridge is inserted into the cartridge inserting opening, the film cartridge is immediately loaded into the camera. Accordingly, users can operate the camera at ease without being anxious about the extent to which the film cartridge is to be inserted.

Elastic rollers each having a driving force for causing the film cartridge are disposed in such a manner as to come into contact with a number of approximately flat portions of the external shape of the film cartridge, and each of the elastic rollers is formed to be approximately as long as a respective one of the approximately flat portions. Accordingly, it is possible to transport the film cartridge highly efficiently, and it is possible to reduce the sizes of a motor which is a driving source, a power source and a speed reducing unit. In addition, it is possible to prevent the deformation of the film cartridge which may occur when the film cartridge is clamped.

There is no risk of occurrence of an abnormal sliding motion, noise or a film scratch, and there is also the advantage that it is possible to incorporate an electrically powered cartridge loading mechanism into a small camera.

Since each of the rollers is disposed perpendicularly to or approximately perpendicularly to a film transporting plane, it is possible to incorporate an electrically powered cartridge loading mechanism as a small unit without increasing the thickness of the camera.

Since each of the rollers is disposed in parallel with or approximately in parallel with the film transporting plane, the horizontal length of the camera can be reduced so that the electrically powered cartridge loading mechanism can be incorporated as a small unit. Since the film cartridge is transported with one of the rollers being maintained in pressure contact with a flat portion which leads to a film drawing opening, the portions of the roller and the flat portion which come into contact with each other can be made comparatively long. Accordingly, it is possible to improve the force with which the film cartridge is clamped as well as the efficiency with which the film cartridge is transported. Therefore, since the electrically powered cartridge loading mechanism can be realized with a smaller power source, it is possible to develop a camera of smaller size.

Incidentally, it is possible to apply the present invention to a lid structure for a cartridge chamber of any type other than the ones described above in connection with the respective embodiments, by making use of the arrangement and construction of any of the above-described arrangements. For example, the lid structure is not limited to the above-described slide lid, and it is also possible to adopt a hinged-door structure which is arranged to open or close with the rotation of a gear.

Similarly, the type of means for moving a film cartridge for the purpose of loading or removing the film cartridge is not limited to only the rollers of the types described above in connection with the respective embodiments, and the present invention can be applied to any type of means for moving a film cartridge, by making use of the arrangement and construction of any of the abovedescribed arrangements. For example, the present invention can be applied to an arrangement which performs loading or removal of a film cartridge by integrally moving the film cartridge while being kept in pressure contact with or in engagement with the film cartridge.

In accordance with the present invention, the arrangement of each of the aforesaid embodiments that is parallel with or perpendicular to the photographic optical axis may be replaced with an arrangement which is parallel with or perpendicular to another image forming optical axis.

In accordance with the present invention, it is also possible to move and control a film cartridge for the purpose of loading or removing the film cartridge, by utilizing a motor for driving a lid for a cartridge chamber.

In accordance with the present invention, a roller on a driving side and a roller on a driven side in the aforesaid embodiments may be disposed in the opposite relationship.

The present invention is not limited to the arrangement in which a film cartridge is inserted from below the camera as described above in connection with each of the embodiments. For example, the present invention can be applied to an arrangement in which a film cartridge is inserted from above the camera or from either side thereof.

The present invention is not limited to the arrangement in which the film cartridge is inserted in the axial direction thereof as described above in each of the aforesaid embodiment.

The present invention can also be applied to a cartridge of any type other than the one referred to in the description of the preferred embodiments, a cartridge having an image recording medium other than film, any other kind of cartridge and a battery or a similar loading subject other than such a cartridge.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

The present invention can also be practiced by combining the above-described embodiments or technical elements thereof with each other, as required.

The present invention can be applied to other kinds of arrangements. For example, the whole or part of the arrangement set forth herein or in the appended claims may constitute one apparatus, or may be connected to other apparatus, or may constitute an element which forms part of another apparatus.

The present invention can also be applied to various type of cameras such as a single-lens reflex camera, a lens shutter camera or a video camera, optical or other apparatuses other than the cameras, apparatuses applicable to the cameras or the optical or other apparatuses, or elements which constitute part of such apparatuses.

What is claimed is:

1. An apparatus adapted to a film cartridge, comprising an image recordation device for recording an image on a film of the film cartridge, a film cartridge chamber and a driving device which performs loading of the film cartridge in said chamber, said driving device including a supplying portion which supplies a driving power by rotating about an axis substantially parallel with an optical axis of said apparatus, said chamber being disposed aside said optical axis, said driving device including a roller having an output shaft disposed substantially in parallel with the optical axis.

2. An apparatus according to claim 1, wherein said roller has a length approximately equal to that of a shorter side of a flat portion of an external shape of the film cartridge.

3. An apparatus adapted to a film cartridge, comprising an image recordation device for recording an image on a film of the film cartridge, a roller for loading of the film cartridge, said roller acting in a flat portion of a step which is formed adjacent A film exit portion of the film cartridge, and a second roller for clamping the film cartridge in cooperation with said roller.

4. An apparatus adapted to a film cartridge, comprising an image recordation device for recording an image on a film of the film cartridge, a roller for loading of the film cartridge, said roller acting on a flat portion of a step which is formed adjacent a film exit portion of the film cartridge. and a motor for driving said roller.

5. An apparatus adapted to a film cartridge, comprising an image recordation device for recording an image on a film of the film cartridge, a film cartridge chamber and a driving device which performs loading of the film cartridge in said chamber, said driving device including a supplying portion which supplies a driving power by rotating about an axis substantially parallel with an optical axis of said apparatus, said chamber being disposed aside said optical axis, said driving device comprising means for moving the film cartridge and a driving unit which drives a cover of the film cartridge.

6. An apparatus according to claim 5, wherein said driving device comprises a connection portion connected to said cover, said connection portion being disposed between an opening to be covered by said cover and the image forming optical axis.

7. An apparatus adapted to a film cartridge, comprising an image recordation device for recording an image on a film of the film cartridge. a film cartridge chamber and a driving device which performs loading of the film cartridge in said chabmer, said driving device including a supplying portion which supplies a driving power by rotating about an axis substantially parallel with an optical axis of said apparatus, said chamber being disposed aside said optical axis, said driving device comprising a driving unit which drives a cover of the film cartridge chamber.

8. An apparatus according to claim 7, wherein said driving device comprises a connection portion connected to said cover, said connection portion being disposed between an opening to be covered by said cover and the image forming optical axis.

9. An apparatus having a photographic plane and a film cartridge chamber and adapted to a film cartridge, comprising a driving device which performs loading of the film cartridge, said driving device including a supplying portion which supplies a driving power by rotating about an axis substantially perpendicular to said photographic plane, said chambers being disposed aside an optical axis of said apparatus said driving device including a roller having an output shaft disposed substantially in parallel with the optical axis.

10. An apparatus according to claim 9, wherein said roller has a length approximately equal to that of a shorter side of a flat portion of an external shape of the film cartridge.

11. An apparatus having a photorgraphic plane and a film cartridge chamber and adated to a film cartridge, comprising a driving device which performs loading of the film cartridge, said driving device including a supplying portion which supplies a driving power by rotating about an axis ubstantially perpendicular to said photographic plane, said chamber being disposed aside an optical axis of said apparatus, said driving device comprising means for moving the film cartridge and a driving unit which drives a cover of the film cartridge.

12. An apparatus according to claim 11, wherein said driving device comprises a connection portion connected to said cover, said connection portion being disposed between an opering to be covered by said cover and the image forming optical axis.

13. An apparatus having a photographic plane and a film cartridge chamber and adapted to a film cartridge, comprising a driving device which performs loading of the film cartridge, said driving device including a supplying portion which supplies a driving power by rotating about an axis substantially perpendicular to said photographic plane, said chamber being disposed aside an optical axis of said apparatus, said driving device comprising a driving unit which drives a cover of the film cartridge chamber.

14. An apparatus according to claim 13, wherein said driving device comprises a connection portion connected to said cover, said connection portion being disposed between an opening to be covered by said cover and the image forming optical axis.

* * * * *

UNITED STATES PATENT AND TRADEMARK OFFICE
CERTIFICATE OF CORRECTION

PATENT NO. : 5,828,921
DATED : October 27, 1998
INVENTOR(S) : Makoto Miyawaki

It is certified that error appears in the above-identified patent and that said Letters Patent is hereby corrected as shown below:

Column 4, line 20, delete "id" and insert --1d--.
Column 5, line 51, delete "13aby" and insert --13a by--.
Column 8, line 53, delete "Id" and insert --1d--.
Column 13, line 48, delete "id" and insert --1d--.
Column 15, line 39, delete "abovedescribed" and insert --above-described--.
Column 16, line 55, delete "A" and insert --a--.
Column 17, line 16, delete "chabmer" and insert --chamber--.
Column 17, line 32, delete "chambers" and insert --chamber--.
Column 18, line 5, delete "adated" and insert --adapted--.
Column 18, line 9, delete "ubstantially" and insert --substantially-.
Column 18, line 18, delete "opering" and insert --opening--.

Signed and Sealed this

Tenth Day of August, 1999

*Attest:*

Q. TODD DICKINSON